US006397309B2

(12) United States Patent
Kedem et al.

(10) Patent No.: US 6,397,309 B2
(45) Date of Patent: *May 28, 2002

(54) SYSTEM AND METHOD FOR RECONSTRUCTING DATA ASSOCIATED WITH PROTECTED STORAGE VOLUME STORED IN MULTIPLE MODULES OF BACK-UP MASS DATA STORAGE FACILITY

(75) Inventors: Nadav Kedem, Tel-Aviv; Haim Bitner, Raanana, both of (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/803,770

(22) Filed: Mar. 12, 2001

Related U.S. Application Data

(62) Division of application No. 08/774,124, filed on Dec. 23, 1996, now Pat. No. 6,202,135.

(51) Int. Cl.[7] .......................... G06F 11/34; G06F 12/16
(52) U.S. Cl. ............................................. 711/162; 714/6
(58) Field of Search ................................ 711/161, 162, 711/165; 714/6; 707/206

(56) References Cited

U.S. PATENT DOCUMENTS

| | | | | |
|---|---|---|---|---|
| 5,089,958 A | * | 2/1992 | Horton et al. ................... 714/5 |
| 5,269,011 A | * | 12/1993 | Yanai et al. ................. 710/100 |
| 5,485,608 A | * | 1/1996 | Lomet et al. ................. 707/202 |
| 5,530,850 A | * | 6/1996 | Ford et al. ....................... 714/6 |
| 5,544,347 A | * | 8/1996 | Yanai et al. ................. 711/162 |
| 5,555,371 A | * | 9/1996 | Duyanovich et al. .......... 714/13 |
| 5,604,662 A | * | 2/1997 | Anderson et al. ............ 361/685 |
| 5,604,862 A | * | 2/1997 | Midgely et al. ................. 714/6 |
| 5,673,381 A | * | 9/1997 | Huai et al. ....................... 714/1 |
| 5,742,792 A | * | 4/1998 | Yanai et al. ................. 711/162 |
| 6,202,135 B1 | * | 3/2001 | Kedem et al. ............... 711/162 |

OTHER PUBLICATIONS

Boyle, P., "Network Integrity Inc: LANtegrity for Netware", PC Magazine, May 14, 1996: [Online] http://www.zdnet.com/pcmag/issues/1509/pcmg0151.htm.*
Boyle, P., "Your Server's Double", PC Magazine, May 14, 1996: [Online] http://www.zdnet.com/pcmag/issues/1509/pcmg0148.htm.*
HP SureStore Tape 12000e [Online] http://hpcc923.external.hp.com/tape/dat12000.html, Jun. 1997.*

* cited by examiner

Primary Examiner—Do Hyun Yoo
Assistant Examiner—Yamir Encarnacion
(74) Attorney, Agent, or Firm—Richard A. Jordan; John M. Gunther; Penelope S. Wilson

(57) ABSTRACT

A computer program product is used with a programmable device to provide a data item reconstruction element for reconstructing information stored on a back-up information storage subsystem associated with at least one protected volume. The back-up information storage subsystem includes a plurality of storage media, each associated with one of a plurality of sets, the information associated with the protected volume being stored on storage media associated with one of the sets. The data item reconstruction element during the reconstruction operation retrieves in parallel information from a plurality of the storage media associated with the one of the sets on which information associated with the at least one protected volume is stored, to obtain the information which is associated with the protected volume.

8 Claims, 23 Drawing Sheets

SYSTEM AND METHOD FOR RECONSTRUCTING DATA ASSOCIATED WITH PROTECTED STORAGE VOLUME STORED IN MULTIPLE MODULES OF BACK-UP MASS DATA STORAGE FACILITY

FIELD OF THE INVENTION

This is a division of Application Ser. No. 08/774,124, filed Dec. 23, 1996, now U.S. Pat. No. 6,202,135 B1. The invention relates generally to digital data storage subsystems for use in storing information from, for example, digital computers. The invention more particularly relates to storage subsystems which may be used as back-up stores for one or more digital computer systems, and which further may be remotely-located from one or more of the digital computer systems so as to ensure that catastrophic failure which may occur at the sites of the respective digital computer systems do not result in unavailability of the information stored thereon.

BACKGROUND OF THE INVENTION

Digital computer systems are used in a number of applications in which virtually continuous availability of data is important to the operation of businesses or other entities using the systems. Generally, computer centers will periodically produce back-up copies of data on their various digital computer systems. Such back-up copies are usually not maintained on a continuous basis, but instead at particular points in time, often at night, and in any case represent the data at the particular points in time at which the back-up copies are generated. Accordingly, if a failure occurs between back-ups, data which has been received and processed by the digital computer systems since the last back-up copy was produced, may be lost.

Typically, such back-up copies will be maintained by the computer centers at their respective sites so that they may be used in the event of a failure, although some off-site archival back-ups may be maintained. Significant additional problems arise in the case of, for example, catastrophic events that can occur, such as may result from, for example, fire, flood or other natural disasters, intentional tampering or sabotage and the like, which may result in unintentional or intentional damage to an entire site or some significant portion thereof, since some or all of the back-up copies may also be damaged and the data contained thereon may be unavailable.

SUMMARY OF THE INVENTION

The invention provides a new and improved digital data storage subsystem which provides secure remote mirrored storage of digital data for one or more digital data processing systems.

In brief summary, the invention provides a data item reconstruction element for, during a reconstruction operation, reconstructing information stored on a back-up information storage subsystem associated with at least one protected volume. The back-up information storage subsystem includes a plurality of storage media each associated with one of a plurality of sets, the information associated with the protected volume being stored on storage media associated with one of the sets. The data item reconstruction element during the reconstruction operation retrieves in parallel information from a plurality of the storage media associated with the one of the sets on which information associated with the at least one protected volume is stored, to obtain the information which is associated with the protected volume.

In one particular embodiment, the storage media comprise magnetic tape cassettes. Since all of the data associated with a particular protected volume is stored on one of the sets, only the tape cassettes of the set on which the protected volume is stored needs to be used in the reconstruction operation, instead of all of the cassettes in the back-up information storage subsystem. This serves to reduce the amount of time required to perform the reconstruction operation for the protected volume.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

I. General

Figure 1:
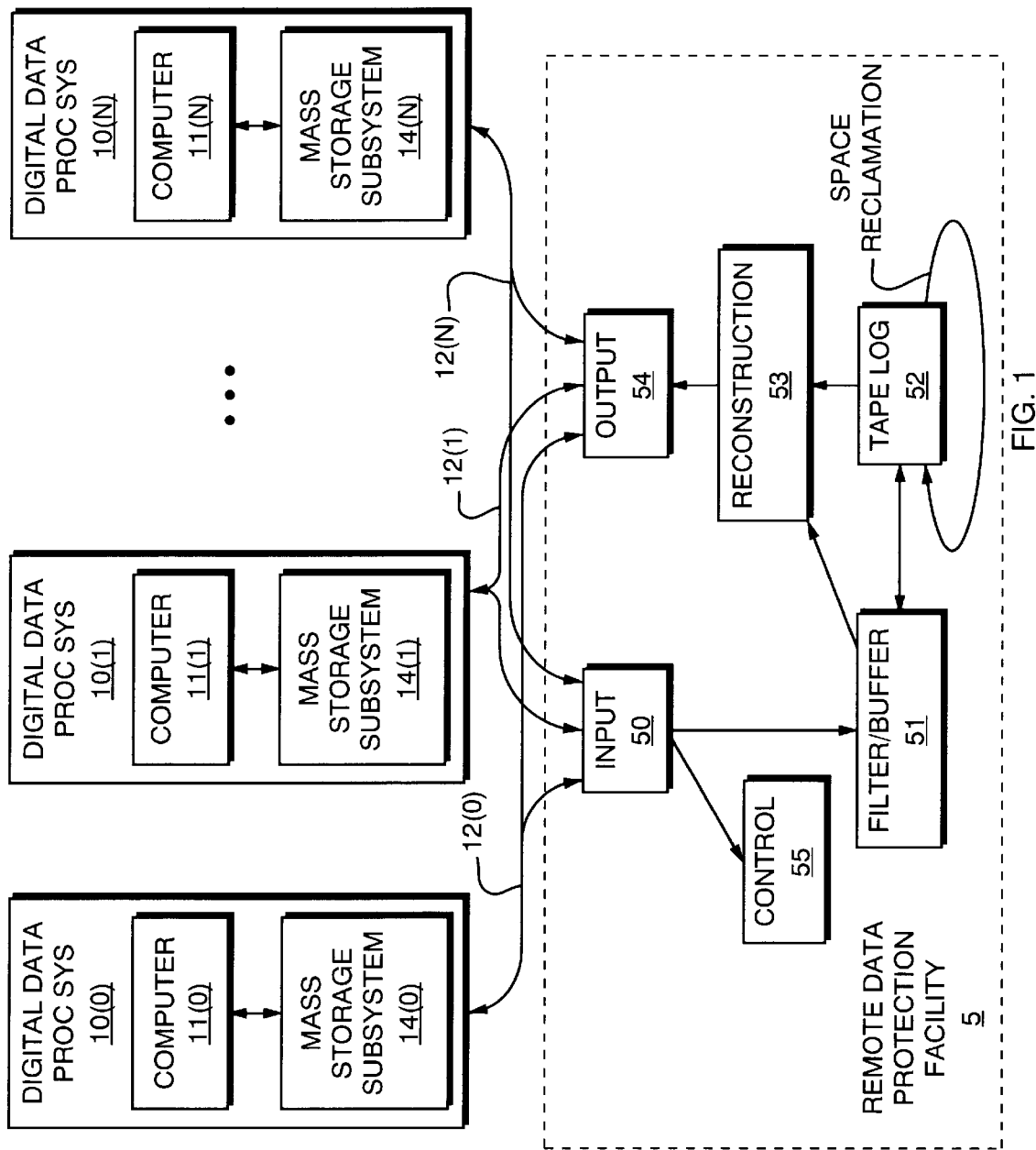
FIG. 1 is a functional block diagram of a system including a remote data protection facility constructed in accordance with the invention.

FIG. 1 is a functional block diagram of a remote data protection facility 5 constructed in accordance with the invention. With reference to FIG. 1, the remote data protection facility 5 is shown connected to one or more digital data processing systems 10(0) through 10(N)(generally identified by reference numeral 10(n)) over one or more communication links 12(0) through 12(N)(generally identified by reference numeral 12(n)). Each digital data processing system 10(n) includes one or more host computers generally identified by reference numeral 11(n) and an associated local mass storage subsystem generally identified by reference numeral 14(n). The host computer 11(n) may comprise, for example, a mainframe computer system, a personal computer, workstation, or the like which can be connected directly or indirectly to the respective mass storage subsystem 14(n). Each host computer 11(n) may initiate an access operation in connection with its associated local mass storage subsystem 14(n) to perform a retrieval operation, in which the local computer 11(n) initiates retrieval of computer programs and digital data (which will generally be referred to herein as "information" or "data") from the local mass storage subsystem 14(n) for use by the host computer 11(n) in its processing operations. In addition, each host computer 11 (n) may initiate storage of processed data in the mass storage subsystem 14(n). Generally, retrieval operations and storage operations in connection with the mass storage subsystems 14(n) will collectively be referred to as "access operations."

The mass storage subsystems 14(n) in one embodiment are generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"), U.S. Pat. No. 5,381,539), issued Jan. 1, 1995 to Moshe Yanai, et al., entitled "System And Method For Dynamically Controlling Cache Management," and U.S. Pat. No. 5,802,557, issued Sep. 1, 1998 to Natan Vishlitzky, et al. and entitled "System And Method For Caching Information In A Digital Data Storage Subsystem" all of which are assigned to the assignee of the present invention and incorporated herein by reference.

The remote data protection facility 5 provides "mirrored" back-up protection for data stored in the mass storage subsystems 14(n) of the various digital data processing systems 10(n), to protect against numerous types of failures, including, for example, catastrophic failures at the sites of the respective mass storage subsystems 14(n). Such catastrophic failures may result from numerous types of events at the respective sites of the mass storage subsystems 14(n), including, for example, fire, flood or other natural disasters, intentional tampering or sabotage, and the like, which may result in unintentional or intentional damage to a mass storage subsystem 14(n) and/or its site and consequent loss of availability of the data stored in the respective mass storage subsystem 14(n). The remote data protection facility 5 will preferably be located geographically remotely from the sites of the digital data processing systems 11(n) sufficiently far to ensure that, if a catastrophic failure occurs at the digital data processing system, the remote data protection facility will survive. It will be appreciated that remote data protection facilities may be provided at a number of sites that are distributed geographically, and a digital data processing system 11(n) may be connected to remote data protection facilities at one or more of the sites. In addition, the remote data protection facility 5 will also protect against digital data processing system failures which are less than catastrophic, such as, for example, failure of some or all of the elements of the mass storage subsystems 14(n) as described below, for reasons that are not limited to catastrophic causes.

Each of the mass storage subsystems 14(n) may transfer information to the remote data protection facility 5 over the respective communication link 12(n) for protected mirrored storage at the remote data protection facility site remote from the respective digital data processing system 10(n). Furthermore, each mass storage subsystem 14(n) may transmit control commands to the remote data protection facility 5 to control certain operations of the remote data protection facility 5. In addition, if the digital data processing system 10(n) requires information stored on the remote data protection facility 5 for processing, which may be a result of an earlier catastrophic failure at the site of the digital data processing system 10(n), failure to maintain suitable information data protection locally at the digital data processing system 10(n), or the like, the digital data processing system 10(n)(in particular its mass storage subsystem 14(n)) may retrieve the information that was previously stored on the remote data protection facility 5 for use in its subsequent processing. Furthermore, if, for example, a digital data processing system 10(n) is unavailable due to, for example, a catastrophe at its site, another digital data processing system 10(n')(n'≠n) may retrieve information from the remote data protection facility 5 which was previously stored by the digital data processing system 10(n) for use in its processing, which may assist in ensuring that the information is continually available for processing even if the digital data processing system 10(n) is not available, thereby ensuring that the information will be available to at least one of the digital data processing systems 10(n).

The communication links 12(n) interconnecting the respective digital data processing systems 10(n), on the one hand, and the remote data protection facility 5, on the other hand, are preferably high-speed data communications links, such as may be used in connection with computer networks, including, for example, optical fibers, high-speed telephone lines, and the like. The information transferred over the communication links 12(n) is preferably compressed, using any convenient compression mechanism, and some or all of the information may be encrypted to protect against improper eavesdropping or dissemination during communication over the communication links. If the remote data protection facility 5 is to be used in connection with information which belongs to multiple owners, each of the owners of the information may use its own encryption mechanism (such as its own encryption algorithm or its own encryption key); as will be clear from the following description, the remote data protection facility 5 may store information in encrypted or unencrypted form, but will preferably be provided with an identifier for each item of information so that, if an item is updated, it will be able to associate the item with its update.

In accordance with one aspect of the invention, in one embodiment, the mass storage subsystems 14(n) provide access requests, including storage requests and retrieval requests, to the remote data protection facility 5 when information is to be stored in, or retrieved from, the remote data protection facility 5, without requiring any action by a host computer 11(n). In that embodiment, the generation of storage and retrieval requests is, accordingly, effectively transparent to the host computers 11(n) and programs being processed thereby. The structure and operation of one embodiment of a digital data processing system 11(n) useful in connection with the remote data protection facility 5 will be described in connection with FIGS. 2 and 3, and the structure and operation of the remote data protection facility 5 itself will be described in connection with FIGS. 4 through 12.

II. Digital Data Processing System 10(n)

Figure 2:
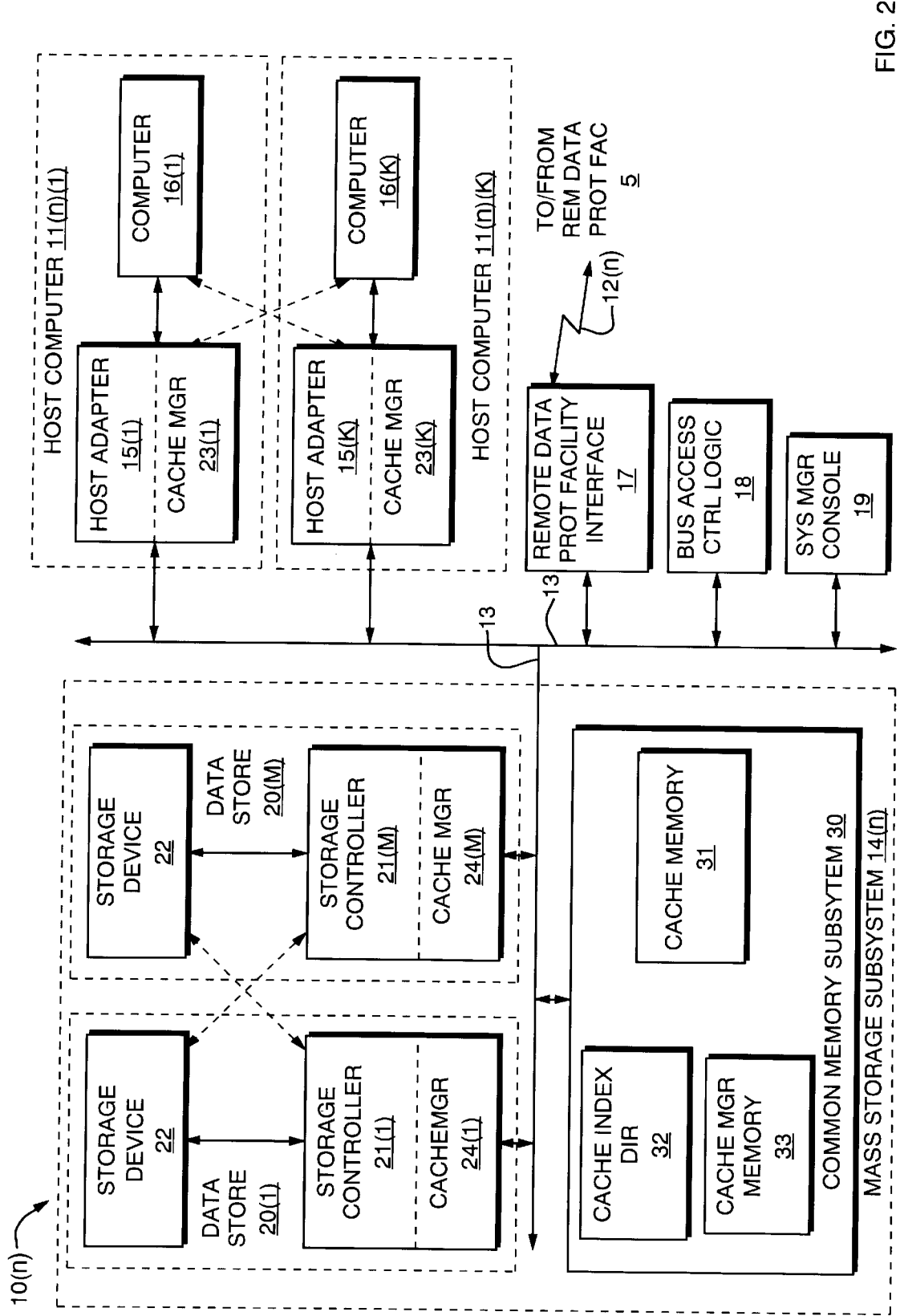
FIG. 2 is a functional block diagram of one embodiment of a digital data processing system which the remote data protection facility.
Figure 3:
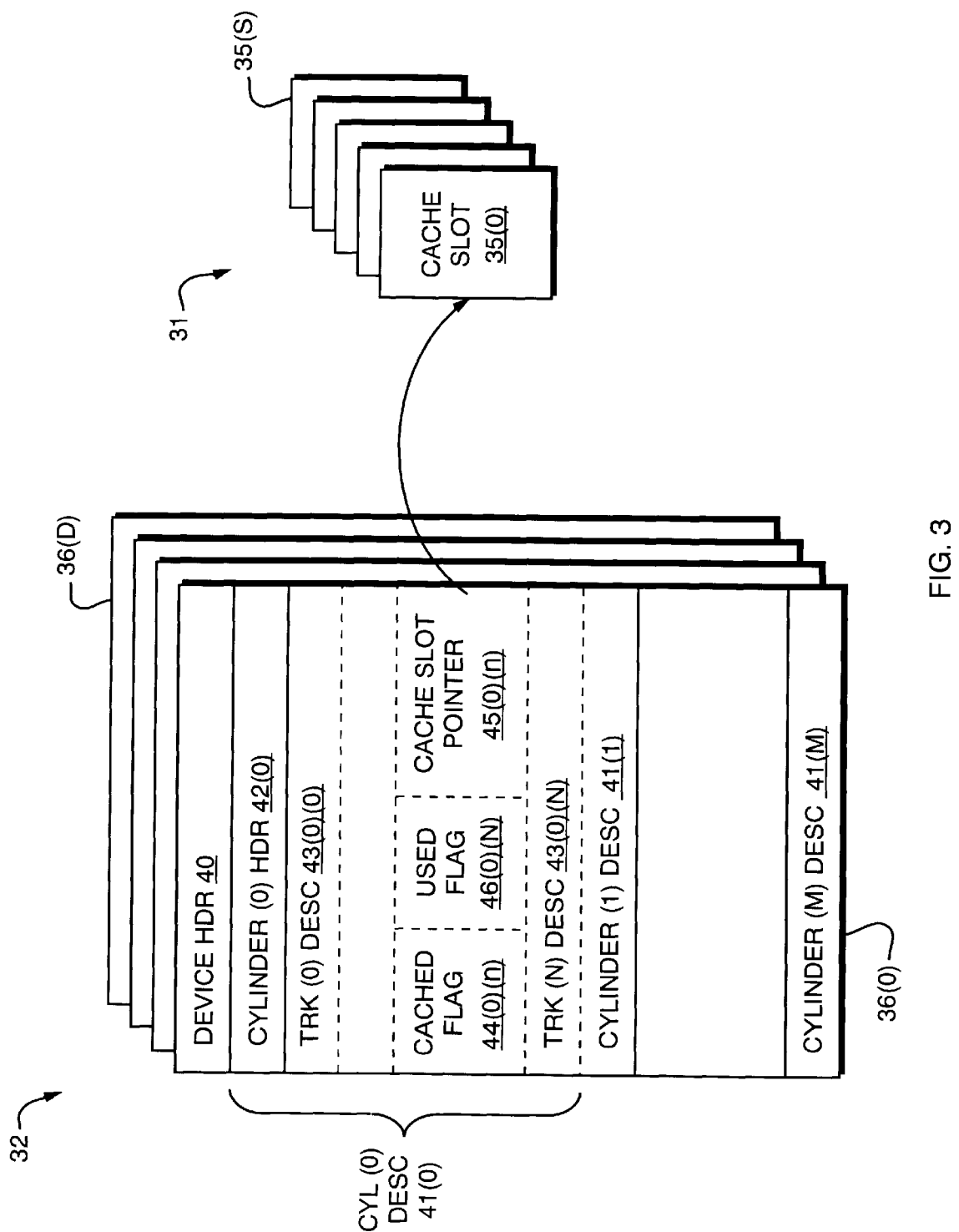
FIG. 3 is a diagram which is useful in understanding the operation of the digital data processing system depicted in FIG. 3.

FIG. 2 depicts a functional block diagram of a digital data processing system 10(n) which is useful with the remote data protection facility 5. The digital data processing system 10(n) is generally similar to the digital data processing system 10(n) described in the above-identified Yanai patent and Shagam and Vishlitzky patent applications. FIG. 3 depicts several data structures which are useful in understanding the operation of the digital data processing system $10(n)$ depicted in FIG. 2. With reference to FIG. 2, digital data processing system $10(n)$ includes a plurality of host computers $11(n)(l)$ through $11(n)(K)$(generally identified by reference numeral $11(n)(k)$), mass storage subsystem $14(n)$ and a remote data protection facility interface 17 interconnected by a common bus 13. Each host computer $11(n)(k)$ includes a local computer $16(k)$, which may comprise, for example, a personal computer, workstation, or the like which may be used by a single operator, or a multi-user computer system which may be used by a number of operators.

Each local computer $16(k)$ is connected to an associated host adapter $15(k)$, which, in turn, is connected to bus 13. Each local computer $16(k)$ may control its associated host adapter $15(k)$ to perform a retrieval operation, in which the host adapter $15(k)$ initiates retrieval of information from the mass storage subsystem $14(n)$ for use by the local computer $16(k)$ in its processing operations. In addition, the local computer $16(k)$ may control its associated host adapter $15(k)$ to perform a storage operation in which the host adapter $15(k)$ initiates storage of processed data in the mass storage subsystem $14(n)$. Generally, storage operations and retrieval operations in connection with the mass storage subsystem $14(n)$ will collectively be referred to as "access operations."

The remote data protection facility interface 17 monitors storage operations by the local computers's host adapters $15(k)$ and, when the host adapter $15(k)$ initiates a storage operation as described below, it will also receive the processed data and transfer it to the remote data protection facility 5 for mirrored storage. The remote data protection facility interface 17 can also initiate retrieval operations to retrieve information from the mass storage subsystem $14(n)$ to be transferred to the remote data protection facility 5 for mirrored storage, as will also be described below. In addition, the remote data protection facility interface 17 can transfer operational commands to the remote data protection facility 5 to enable the remote data protection facility to perform predetermined operations. The operational commands may be provided by, for example, a system manager through the host computers $11(n)(l)$, or through a system manager console 19. Furthermore, the remote data protection facility interface 17 can also receive information from the remote data protection facility 5 for storage in the mass storage subsystem $14(n)$.

In connection with both retrieval and storage operations, the host adapter $15(k)$ will transfer access operation command information, together with processed data to be stored during a storage operation, over the bus 13, and a bus access control logic circuit 18 is provided to arbitrate among devices connected to the bus, including the host adapters $15(k)$, which require access to the bus 13. In controlling access to the bus 13, the bus access control logic circuit 18 may use any of a number of known bus access arbitration techniques, including centralized bus access control techniques in which bus access is controlled by one device connected to bus 13, as well as distributed arbitration techniques in which bus access control logic circuitry is distributed among the devices which require access to the bus. In addition, the digital data processing, system $10(n)$ includes the system manager console 19 which, in addition to permitting the system manager to control the remote data protection facility 10, also call permit a system manager to control various elements of the system 10 in a conventional manner. It will be appreciated that, although the system manager console 19 is shown in FIG. 1 as a separate element, any of the local computers $16(k)$ may provide the functionality of the console 19, in which case a separate element need not be provided.

The mass storage subsystem $14(n)$ in one embodiment is generally similar to the mass storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the mass storage subsystem $14(n)$ includes a plurality of digital data stores $20(l)$ through $20(M)$(generally identified by reference numeral $20(m)$), each of which is also connected to bus 13. Each of the data stores $20(m)$ stores information, including programs and data, which may be accessed by the host computers $11(n)(k)$ as well as processed data provided to the mass storage subsystem $14(n)$ by the host computers $11(n)(k)$. Generally, the information is in the form of records, which may be of variable length.

Each data store $20(m)$, in turn, includes a storage controller $21(m)$ and one or more storage devices generally identified by reference numeral 22. The storage devices 22 may comprise any of the conventional magnetic disk and tape storage devices, as well as optical disk storage devices and CD-ROM devices from which information may be retrieved. Each storage controller $21(m)$ connects to bus 13 and controls the storage of information which it receives thereover in the storage devices connected thereto. In addition, each storage controller $21(m)$ controls the retrieval of information from the storage devices 22 which are connected thereto for transmission over bus 13. In addition to controlling access by the host adapters $15(k)$ to bus 13, the bus access control logic circuit 18 also controls access by the storage controllers to the bus 13.

The mass storage subsystem $14(n)$ also includes a common memory subsystem 30 for caching information during an access operation and event status information providing selected status information concerning the status of the host computers $11(n)(k)$ and the data stores $20(m)$ at certain points in their operations. The caching of event status information by the common memory subsystem 30 is described in detail in U.S. patent application Ser. No. 08/532,240 filed Sep. 22, 1995 in the name of Eli Shagam et al., and entitled Digital Computer System Including Common Event Log for Logging Event Information Generated By A Plurality of Devices assigned to the assignee of the present invention and incorporated herein by reference. The information cached by the common memory subsystem 30 during, an access operation includes data provided by a host computer $11(n)(k)$ to be stored in a data store $20(m)$ during a storage operation, as well as data provided by a data store $20(m)$ to be retrieved by a host computer $11(n)(k)$ during a retrieval operation. The common memory subsystem 30 effectively operates as a buffer to buffer information transferred between the host computers $11(n)(k)$ and the data stores $20(m)$ during a local access operation.

The common memory subsystem 30 includes a cache memory 31, a cache index directory 32 and a cache memory manager 33, which are generally described in U.S. Pat. No. 5,381,539, in the name of Moshe Yanai, et al., entitled "System And Method For Dynamically Controlling Cache Management", which is assigned to the assignee of the present invention and incorporated herein by reference. The cache memory 31 operates as a buffer in connection with storage and retrieval operations, in particular buffering records received from the host computers $11(n)(k)$ to be transferred to the storage devices for storage, and buffering data received from the data stores $20(m)$ to be transferred to the host computers $11(n)(k)$ for processing.

The cache memory 31 and cache index directory 32 will generally be described in connection with FIG. 3. With reference to FIG. 3, the cache memory 31 includes a series of storage locations, which are organized in a series of cache slots 35(0) through 35(S)(generally identified by reference numeral 35(s)). The storage locations are, in turn identified by a series of addresses, with the starting address of a cache slot being identified by a base address. The cache slots 35(s), in turn, operate as the cache memory's buffer as described above.

The cache index directory 32 operates as an index for the cache slots 35(s) in the cache memory 31. The cache index directory 32 includes a plurality of cache index tables 36(0) through 36(D)(generally identified by reference numeral 36(d)), each of which is associated with one of the storage devices 22 in the storage subsystem 14(n). Each cache index table 36(d) includes a device header field 40, which provides, for example, selected identification and status information for the device 22 associated with the cache index table 36(d). In addition, each cache index table 36(d) includes a plurality of cylinder descriptors 41(0) through 41(C)(generally identified by reference numeral 41(c)) each of which is associated with one of the cylinders in the storage device 22 that is associated with the cache index table 36(d). Each cylinder descriptor 41(c), in turn, includes a cylinder header 42(c), which provides, for example, selected identification and status information for the cylinder associated with the cylinder descriptor 41(c).

In addition, each cylinder descriptor 41(c) includes a plurality of track descriptors 43(c)(0) through 43(c)(T) (generally identified by reference numeral 41(t)), each of which is associated with one of the tracks in the cylinder 41(c). Each track descriptor 43(c)(t), in turn, includes information for the associated track of the storage device 22, including whether a copy of the data stored on the track is cached in the cache memory 31, and, if so, the identification of the cache slot 35(s) in which the data is cached. In particular, each track descriptor 43(c)(t) includes a cached flag 44(c)(t) and a cache slot pointer 45(c)(t). The cached flag 44(c)(t), if set, indicates that the data on the track associated with the track is cached in a cache slot 35(s), and the cache slot pointer 45(c)(t) identifies the particular cache slot in which the data is cached. In addition, each track descriptor 43(c)(t) includes a used flag 46(c)(t) which may be used to indicate whether the data, after being stored in the cache slot identified by the cache slot pointer 43(c)(t), has been used by the host computer 11(n)(k) during a retrieval operation. This "host used" flag may be used to determine whether the cache slot may be re-used for another access operation.

Each of the host adapters 15(k) and each of the storage controllers 21(m) includes a cache manager 23(k) and 24(m), respectively, to access to the cache memory 31, cache index directory 32 and cache manager memory 33. The particular operations performed during an access operation will depend on a number of factors, including the access operation to be performed, whether or not the data from the particular track to be accessed is cached in the cache memory 31, and whether or not the data contained in a cache slot 35(s) has been modified or updated by a host adapter's cache manager 24(k) during a storage operation. As described in the aforementioned Shagam application, the host computers 11(n)(k) typically perform storage and retrieval operations in connection with data in the cache memory 31, and the storage controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations). In performing the staging and de-staging operations, the storage controllers 21(m) generally transfer data to and from the cache memory 31 in units of a track, that is, they will during a staging operation transfer all of the data in a track from a storage device 22 to a cache slot 35(s) in the cache memory 31, and during a de-staging operation copy all of the data in a slot in the cache memory 31 to the track of the storage device 22 from which it was originally staged.

The cache manager memory 33 maintains a number of work lists which are used to control operations by the host adapters 15(k) and storage controllers 21(m) during an access operation. In particular, the cache manager memory 33 includes a cache slot replacement list, a pending write list and various lists which the host adapters 15(k) and storage controllers 21(m) use to communicate to coordinate staging operations (not shown). The various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 24(m) uses the cache slot replacement list to select a cache slot 35(s) into which it will load the data retrieved from a storage device. (The aforementioned Shagam application describes a modified least-recently-used cache-slot re-use methodology used in one embodiment of the invention). The pending write list is used to identify cache slots 35(s) which contain updated data, which has not been written to a storage device. During de-staging operations, the storage controllers' cache managers 24(m) will use the write pending list to identify cache slots to be written to a storage device 22. Preferably, the cache slots 35(s) which are identified in the pending write list will not also be listed in the cache slot replacement list, so that cache slots 35(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n)(k). The host computers' cache managers 23(m) use the stage request lists to store stage requests to be performed by the respective data stores 20(m), and the data stores' cache managers 24(m) use the stage completion lists to store stage completion messages to indicate to the respective host computers' cache managers 23(m) that the stage requests have been completed.

Generally, a host computer 11(n)(k), during a retrieval operation, attempts to retrieve the data from the cache memory 31. However, if the data is not in the cache memory 31, it will enable the storage controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the host computer 11(n)(k) will retrieve the data from the slot. Similarly, during a storage operation, the host computer 11(n)(k) will determine whether the particular track into which the data is to be written is in a slot in the cache memory 31 and if so will store the data in the slot. However, if the data is not in the cache memory 31, the host computer 11(n) will enable the cache manager 24(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the host computer 11(n)(k) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the a host computer 11(n)(k) has only performed retrieval operations therewith), the data in the cache slot corresponds to the data in the storage device 22.

More specifically, during a retrieval operation, the cache manager 23(k) of the initiating host adapter 15(k) will initially access the cache index table 36(d) in the cache index directory 32 associated with the storage device 22 in which the data to be retrieved is stored, in particular accessing the track descriptor 43(c)(t) of the cylinder descriptor 41(c) to determine, from the condition of the cached flag 44(c)(t), whether the data from the track is cached in a cache slot 35(s) in the cache memory. If the cached flag 44(c)(t) indicates that data from the track is cached in a cache slot 35(s), the cache manager 23(k) uses the cache slot pointer 45(c)(t) to identify the particular cache slot 35(s) in which the data is cached an(d retrieves the required data from the cache slot 35(s).

On the other hand, if the cache manager 23(k) determines from the cached flag 44(c)(t) that the data from the track is not cached in a cache slot 35(s), it will generate a stage request to enable the storage controller 21(m) for the storage device 22 which maintains the data to be retrieved, load the stage request in the stage request queue for the data store 20(m) and notify the storage controller 21(m) that a stage request has been loaded in the stage request queue. At some point after receiving the notification, the storage controller 21(m) will retrieve the stage request and perform a staging operation in response thereto. In performing the staging operation. the storage controller 21(m) will retrieve the data from the requested track, use the above-described cache slot replacement list to select a cache slot 35(s), load the data into cache slot 35(s) and update the track descriptor 43(c)(t) in the cache index table 36(d) associated with the storage device 22 to indicate that the data from the track is in the cache slot 35(s), in particular setting the cached flag 44(c)(t) and loading a pointer to the cache slot in the cache slot pointer 45(c)(t).

After the storage controller 21(m) has completed the staging operation, it will load a staging completed message in the stage completion list in the cache manager memory 33 associated with the host computer 11(n)(k) which issued the staging request, and notify the host computer's cache manager 23(k) that a stage completed message has been loaded therein. At some point after receiving the notification. the host computer's cache manager 23(k) can repeat the operations performed in connection with the retrieval request as described above. in particular accessing the cache index table 36(d) in the cache index directory 32 associated with the storage device 22 in which the data to be retrieved is stored, in particular accessing the track descriptor 43(c)(t) of the cylinder descriptor 41(c) to determine, from the condition of the cached flag 44(c)(t), whether the data from the track is cached in a cache slot 35(s) in the cache memory and, if so, use the cache slot pointer 45(c)(t) to identify the particular cache slot 35(s) in which the data is cached and retrieve the required data from the cache slot 35(s). Since at this point the cached flag 44(c)(t) should indicate that the data from the track is cached in a cache slot 35(s), the cache manager 23(k) should be able to complete the retrieval operation.

Similar operations occur during a storage operation, in which data in a particular track is updated, with the additional operation of removing the identification of the cache slot 35(s) containing data to be updated from the replacement list and loading it into the pending write list. During a storage operation, the cache manager 23(k) of the initiating host adapter 15(k) will initially access the cache index table 36(d) in the cache index directory 32 associated with the storage device 22 in which the data to be updated is stored, in particular accessing the track descriptor 43(c)(t) of the cylinder descriptor 41(c) to determine, from the condition of the cached flag 44(c)(t), whether the data front the track is cached in a cache slot in the cache memory. If the cached flag 44(c)(t) indicates that the data from the track is cached in a cache slot 35(s), tile cache manager 23(k) uses the cache slot pointer 45(c)(t) to identify the particular cache slot 35(s) in which the data is cached and loads the update data into the cache slot 35(s). In addition, the host adapter's cache manager 23(k) will remove the identification of the selected cache slot 35(s) from the replacement list to the pending write list so that the cache slot 35(s) will not be re-used until a de-staging operation has been performed in connection with the cache slot 35(s).

On the other hand, if the cache manager 23(k) determines firm the cached flag 44(c)(t) that the data from the track is not cached in a cache slot 35(s), it will generate a stage request to enable the storage controller 21(m) for the storage device 22 which maintains the data to be retrieved, load the stage request in the stage request queue for the data store 20(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, select a cache slot 35(s), load the data into cache slot 35(s) and update the track descriptor 43(c)(t) in the cache index table 36(d) associated with the storage device 22 to indicate that the data from the track is in the cache slot 35(s), in particular setting the cached flag 44(c)(t) and loading a pointer to the cache slot in the cache slot pointer 45(c)(t).

After the storage controller 21(m) has completed the staging operation, it will load a staging completed message in the stage completion queue in the cache manager memory 33 associated with the host computer 11(n)(k) which issued the staging request, and notify the cache manager 23(k) that a stage completed message has been loaded therein. At some point after receiving the notification, the cache manager 23(k) can repeat the operations performed in connection with the retrieval request as described above, in particular accessing the cache index table 36(d) in the cache index directory 32 associated with the storage device 22 in which the data to be retrieved is stored, in particular accessing the track descriptor 43(c)(t) of the cylinder descriptor 41(c) to determine, from the condition of the cached flag 44(c)(t), whether the data from the track is cached in a cache slot 35(s) in the cache memory and, if so, use the cache slot pointer 45(c)(t) to identify the particular cache slot 35(s) in which the data is cached and retrieve the required data from the cache slot 35(s). Since at this point the cached flag 44(c)(t) should indicate that the data from the track is cached in a cache slot 35(s), the cache manager 23(k) should be able to complete the storage operation as described above.

As described above, the data stores' cache managers 24(m) also perform de-staging operations using the pending write list to identify cache slots 35(s) which contain updated data to be written back to the original storage device 22 and track whose data was cached in the respective cache slots 35(s). After the data store's cache manager 24(m) has de-staged a cache slot 35(s), it will notify the remote data protection facility 5, which, in turn will retrieve the records in the de-stage cache slot 35(s) and transfer them to the remote data protection facility 5 for storage. After it receives an acknowledgement for the records from the remote data protection facility 5, the remote data protection facility 5 can remove the cache slot's identification from the pending write list and return it to the replacement list so that the cache slot 35(s) can be reused.

As indicated above, the remote data protection facility interface 17 performs several operations. Generally, the remote data protection facility interface 17:

(i) monitors storage operations by the local computers's host adapters 15(k) and, when a host adapter 15(k) initiates a storage operation, it will also receive the processed data and transfer it to the remote data protection facility 5;

(ii) initiates retrieval operations to retrieve information from the mass storage subsystem 14(n) for transfer to the remote data protection facility 5 for mirrored storage, and (iii) receives information from the remote data protection facility 5 for storage in the mass storage subsystem 14(n) during a reconstruction operation.

In addition, the remote data protection facility interface 17 can transfer operational commands provided by a system manager to the remote data protection facility 5 to control the operations thereof. The remote data protection facility interface 17 can also receive status information representing the operational status of the remote data protection facility 5, which status information can be provided to a system manager.

As will be described below in connection with FIGS. 4 through 13, the remote data protection facility 5 stores data from the digital data processing systems 10(n) in the form of fixed-length portions which will be referred to as "segments." In one embodiment, in which the storage devices comprise disk storage units, each segment is selected to comprise contents of an entire track of a respective storage device 22, which can include one or more CKD records as described above. Generally, when a host adapter 15(k) initiates a storage operation, the information that is stored will not comprise a complete segment of data (that is, data for a complete track) in the cache memory 31, but instead will store only information comprising a partial segment. As described above, the remote data protection facility interface 17 will also transfer this partial segment to the remote data protection facility 5 for mirrored storage.

As will be described below, the remote data protection facility 5 operates in two phases, including (i) filtering and buffering information received from the digital data processing systems 10(n) and thereafter (ii) storing the filtered information on, in one embodiment, magnetic tape storage cartridges. During the filtering and buffering phase, the remote data protection facility 5 will buffer all of the information that it receives from the remote data protection facility interface. However, at some point prior to storing the filtered information on the tape cartridges, the remote data protection facility 5 will determine whether the particular information received from the remote data protection facility interface 17 comprises a partial segment or a full segment, and if the information comprises a partial segment the remote data protection facility 5 will request the remote data protection facility interface 17 to provide the complete segment. At that point, the remote data protection facility interface 17 can initiate a retrieval operation in connection with the mass storage subsystem 14(n) to retrieve the segment. The operations performed by the remote data protection facility interface 17 and the mass storage subsystem 14(n) during this retrieval operation are similar to those described above in connection with retrieval operations initiated by a host computer's host adapter 15(n), and may necessitate performance of a staging operation as described above to enable the segment to be loaded in the cache memory 31. After the segment has been loaded in the cache memory 31, the remote data protection facility interface 17 can retrieve it and transfer it to the remote data protection facility 5.

When the full segment is received by the remote data protection facility 5, the filtering performed during the filtering phase will preferably provide that the previously-received partial segment will be filtered-out and discarded. It will also be apparent from the description of the remote data protection facility 5 below that if it (that is, the remote data protection facility 5) has received any other partial segments for the particular segment prior to receiving the full segment from the remote data protection facility interface 17, those other partial segments will also be discarded, since the information contained therein will also be contained in the full segment received from the remote data protection facility interface 17. On the other hand, if the remote data protection facility interface 17 is unable to provide the full segment, which may occur, for example, as a result of a malfunction or other failure in connection with the mass storage subsystem 14(n), the partial segment(s) may be useful in reconstructing the full segment during a reconstruction operation.

III. Remote Data Protection Facility 5

A. General

The structure and operation of the remote data protection facility 5 will be described in connection with FIGS. 1 and 4 through 13. With reference initially to FIG. 1, the remote data protection facility 5 generally includes an input module 50, a filter/buffer module 51, a tape log module 52, a reconstruction module 53 and an output module 54, all under control of a control module 55. The input module 50, as will be described below in detail in connection with FIG. 4, receives information from the respective digital data processing systems 10(n) which is to be stored by the remote data protection facility 5, couples it to the filter/buffer module 51, and generates acknowledgments for transmission to the digital data processing system 10(n) from which the information was received. In addition, the input module 50 received control commands from the respective digital data processing systems 10(n), and couples them to the control module 55. The control commands may, for example, enable the remote data protection facility 5 to begin storing information from the digital data processing system 10(n), retrieve previously-stored information for transmission to the same or another digital data processing system 10(n), and the like.

The filter/buffer module 51 performs the filtering and buffering phase as described above. The filter/buffer module 51 buffers information received from the input module, formats it into predetermined formats for storage, and filters the buffered information, as will be described below in detail in connection with FIGS. 5 and 8. In one particular embodiment, the filter/buffer module 51 buffers the received information using one or more disk storage devices, although it will be appreciated that other digital data storage devices, such as conventional random access memories, may be used in instead of the disk storage devices or to augment the storage provided by the disk storage devices. If information received from a digital data processing system 10(n) is in the form of a partial segment, the filter/buffer module 51 at some point during the filtering and buffering operation will also request the source digital data processing system 10(n), that is, the digital data processing system 10(n) which provided the partial segment was received, to provide the entire segment.

After filtering by the filter/buffer module 51, the filtered information is transferred to the tape log module 52 for storage. The tape log module 52 performs the storage phase as described above. In the tape log module 52, which will be described below in detail in connection with FIGS. 6, 10 and 11, the information received from the digital data processing systems 10(n) is logged onto tape cartridges, such as digital linear tape ("DLT") cartridges, using a conventional autochanger (not separately shown) which forms part of the tape log module 52. In logging the information onto the tape cartridges, the tape log module 52 stores the information received from the filter/buffer module 51 on a currently-selected "logging" cartridge, without regard to whether the information currently being stored is an update of previously-stored information which may be stored on the same or another cartridge. As will be described below in connection with FIGS. 6, 10 and 11, the tape log module 52 uses various data structures to determine, if multiple updates for the same segment are stored on one or more tape cartridge in the tape log module 52, which update was most recently received from the respective digital data processing system 10(n), and, thus, is the valid update.

In one embodiment, the autochanger includes eighty-eight tape cartridges divided into eight groups, or "logging sets," of eleven cartridges each. The autochanger includes one robot arm, which is used to move cartridges between cartridge storage slots in which the cartridges are normally stored and ones of nine drives for storing information on and retrieving information from the tape cartridges. Generally, one drive will be allocated for use with an associated one of the logging sets, and the ninth drive will be used if a space reclamation operation is being performed in connection with a cartridge from one of the logging sets as described below.

Each "protected volume" whose data is mirrored by the remote data protection facility 5 is associated with one logging set, although one logging set may be associated with a number of protected volumes. In one embodiment, each protected volume is associated with one of the storage devices 22 in a mass storage subsystem 14(n). Each segment which is received by the remote data protection facility 5 is associated with a segment identifier that uniquely identifies the particular mass storage subsystem 14(n), protected volume, cylinder and track on which the segment is stored.

Periodically, the tape log module 52 will perform a space reclamation operation in connection with a cartridge, as a space reclamation source cartridge, to consolidate all of the valid segment updates from the space reclamation source cartridge onto one or more other cartridges. Preferably, a large portion of the segment updates on the space reclamation source cartridge will be invalid, that is, they will have been superseded by more recently-received segment updates which may be stored on other cartridges. After the space reclamation operation, the space reclamation source cartridge may be considered empty and used for storing data during subsequent storage and space reclamation operations. During a space reclamation operation, the valid segment updates will be copied from the source cartridge onto the cartridge from the log set which is currently being used for logging, that is onto which information from the filter/buffer module 51 is being stored. The space reclamation operation will be performed concurrently with the logging operation, so that valid segment updates retrieved from the space reclamation source cartridge will be stored on the current logging cartridge interleaved with segment updates that are provided to the tape log module 52 by the filter/buffer module 51. During a space reclamation operation, if the current logging cartridge becomes filled another cartridge may be selected as the current logging cartridge; accordingly, during a space reclamation operation, valid segment updates from the space reclamation source cartridge may be copied onto several cartridges in the logging set.

When a protected volume needs to be provided with information stored in a log set of the tape log module 52, in either a full reconstruction operation or a partial reconstruction operation, the reconstruction module 53 will retrieve the required information and provide it to the output module 54, which, in turn, provides the information to the protected volume's digital data processing system 10(n) or to another digital data processing system 10(n'). In that operation, the reconstruction module 53 may obtain the information from the particular ones of the cartridges on which the information has been stored by the tape log module 52, as well as from the filter/buffer module 51 if that module 51 is buffering more recently received information than is stored on the cartridges. The reconstruction module 53 may perform a full reconstruction operation if all of the information from, for example, a particular digital data processing system 10(n) needs to be reconstructed, which may occur, for example, in the event of a catastrophic failure at the digital data processing system 10(n). On the other hand, the reconstruction module 53 may perform a partial reconstruction operation if information from only one or several storage devices 22 (FIG. 2) needs to be provided, which can occur, for example, in the event of a failure by the storage devices 22.

During a reconstruction operation in connection with a protected volume, the reconstruction module 53 will enable the tape log module 52 to scan through the cartridges of the log set on which the information from the protected volume is mirrored to retrieve the valid information for the protected volume or volumes whose information is to be reconstructed. In addition, the reconstruction module 53 can retrieve information that is currently being buffered for the protected volume or volumes whose information is to be reconstructed from the filter/buffer module 51 and merge that information with the information retrieved from the cartridges. The reconstruction module 53 will provide the merged information to the output module 54, which in turn will transmits the information to the protected volume's digital data processing system 10(n), or to another digital data processing system 10(n')(n'≠n) if, for example, there was a catastrophic failure at the original digital data processing system 10(n).

The reconstruction module 53 can perform essentially two types of reconstruction operations, namely, a full reconstruction operation and a partial reconstruction operation. In the embodiment in which a protected volume comprises a single storage device 22, in a partial reconstruction, the reconstruction module can perform a reconstruction operation in connection with the mirrored information for the protected volume and provide the reconstructed information to the output module 54 to be transferred to the mass storage subsystem 12(n) which contains the protected volume. The mass storage subsystem 12(n), in turn, can distribute the information among its other storage devices, load it onto a spare, or the like. During a partial reconstruction operation, the tape log module 52 can retrieve information from a plurality of the cartridges of the log set in parallel, in multiple ones of the drives provided by the autochanger, to reduce the time required for the partial reconstruction. A full reconstruction operation, in which all or a subset of protected volumes of one or more mass storage subsystems 14(n) will be reconstructed, is generally similar, except that information may be retrieved from cartridges from multiple log sets. In any case, by limiting storage of information from a single protected volume to a single log set, the number of cartridges that need to be scanned to reconstruct the information from the protected volume can be limited, which, in turn, can also serve to reduce the time required for the partial reconstruction.

As indicated above, the various elements 50 through 55 of the remote data protection facility 5 operate under control of the control module 55. The control module 55 controls the remote data protection facility in response to commands received from the various digital data processing systems 10(n), which may enable it to, for example, initiate logging for a respective digital data processing system 10(n), and initiate a full or partial data reconstruction operation, as will be described below.

B. Input Module 50

Figure 4:
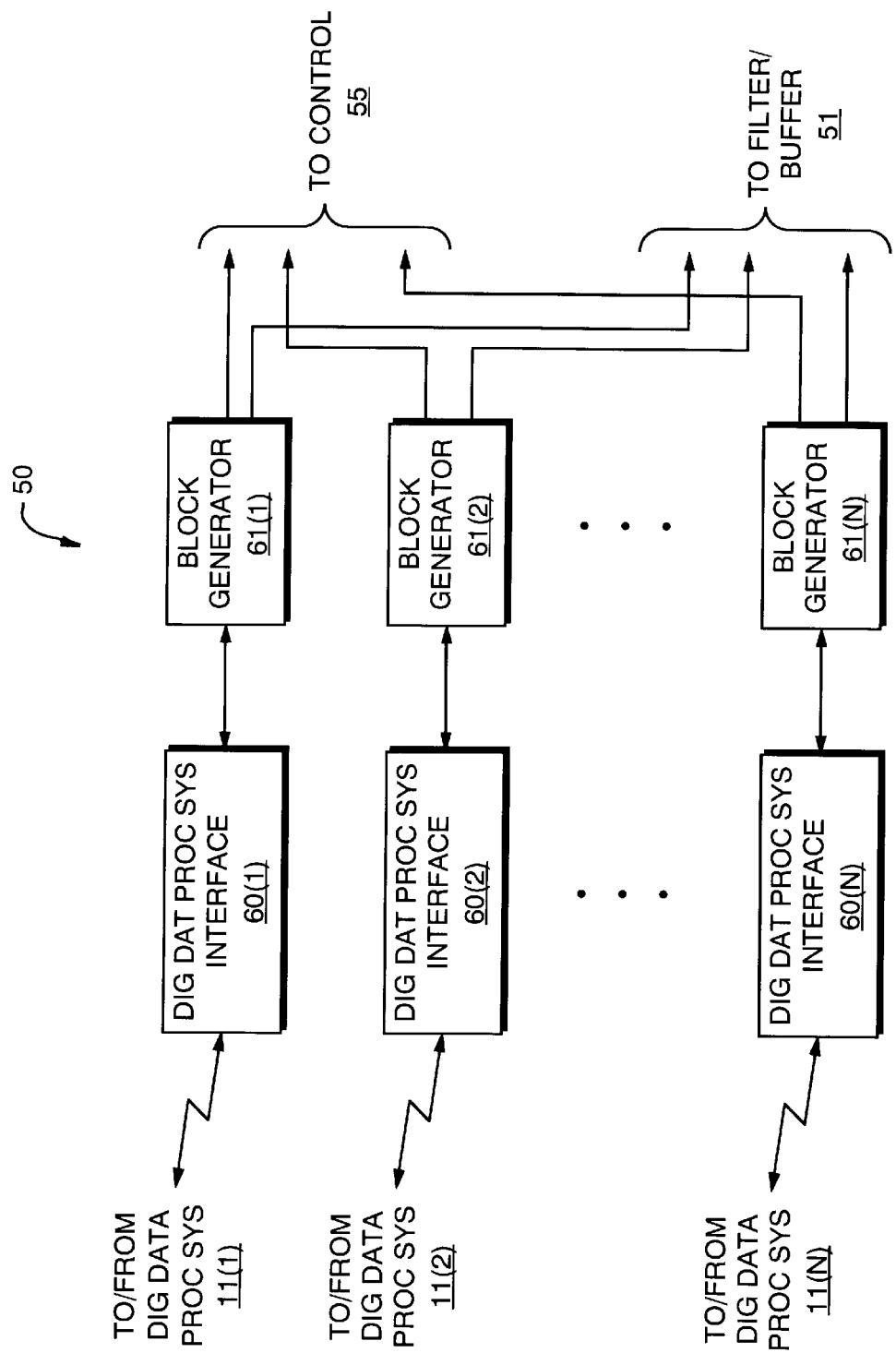
FIG. 4 is a functional block diagram of an input module useful in the remote data protection facility depicted in FIG. 1.

FIG. 4 depicts the structure of the input module 50 useful in the remote data protection facility 5. With reference to FIG. 4, the input module 50 includes a plurality of interfaces 60(l) through 60(N)(generally identified by reference numeral 60(n)) each of which is connected to receive information from a correspondingly-indexed digital data processing system 10(n) over a communication link 12(n). Each interface 60(n) receives signals, either in electrical or optical form representing digital information or control commands that are transmitted to the remote data protection facility 5, converts the signals to digital form and provides the digitized information to a respective block generator 61(l) through 61(N)(generally identified by reference numeral 61(n)).

Each block generator 61(n), in turn, receives the digital information provided by the interface 60(n) and generates therefrom individual items of information, and in addition aggregates the individual items into blocks to be logged. Each item of information, which will be termed herein a "segment update," corresponds to information from either a partial segment or a full segment, with, as indicated above, a full segment corresponding in one embodiment to the information stored on a track of a storage device 22. Since a segment update may comprise a partial segment or a full segment, a segment update may be of variable length, up to a maximum length which corresponds to the maximum amount of information that can be stored on a track of a storage device 22. Each segment update is associated with a segment identifier, which in one embodiment is a selected function of an identifier identifying the mass storage subsystem 14(n) which contains the protected volume on which the segment associated with the update is stored, an identifier for the protected volume itself, and an identifier for the track on which the segment update is stored. The segment identifier will remain constant if the contents of the record are changed, modified or updated, for reasons which will be clear from the following description.

Each block generator 61(n) aggregates the received segment updates, along with the segment identifiers and other information, into fixed-sized blocks, which have structures which will be described below in more detail in connection with FIG. 5. The blocks may have any convenient length; in one embodiment, in which the filter/buffer module 51 buffers the information received from the digital data processing systems 10(n) in disk storage devices, the block length is selected to be greater than the maximum segment length. Each block accommodates at least one segment update. In one embodiment, each segment update is stored in at most one block, so that segment updates will not be divided across multiple blocks. Each block generator 61(n), after generating the segment updates and aggregating them into respective blocks, passes the blocks to the filter/buffer module 51 for buffering and filtering.

In addition, each block generator 61(n) receives the digital data relating to control commands and generates command information therefrom which it provides to the control module 55. The control information may enable the control module to, for example, enable the filter/buffer module 51, tape log module 52 and reconstruction module 53 to begin operations in connection with a new digital data processing system, and to perform a full or partial reconstruction operation to reconstruct information which it has been logging for a digital data processing system.

C. Filter/Buffer Module 51

Figure 5:
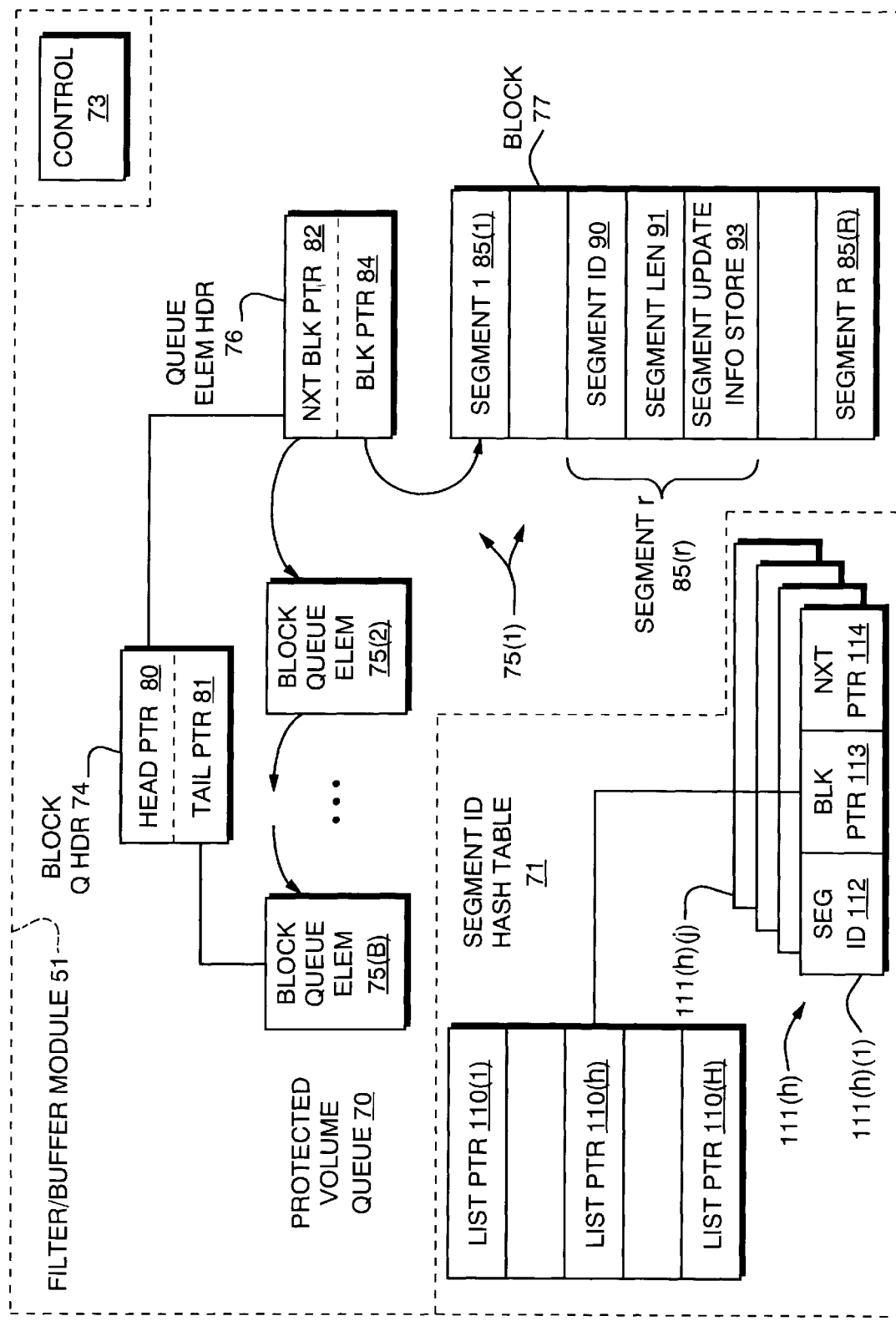
FIG. 5 is a functional block diagram of a filter/buffer module which is useful in the remote data protection facility depicted in FIG. 1.

FIG. 5 depicts the structure of the filter/buffer module 51 useful in the remote data protection facility 5 (FIG. 1). With reference to FIG. 5, the filter/buffer module 51 maintains a block queue 70, and a segment identifier hash table 71 all under control of a control module 73. The block queue 70 generally includes the blocks generated by the block generators 61(n). The block queue 70 can have enqueued therewith a variable number of blocks. After each block has passed through the queue, the filter/buffer module 51 selectively provides ones of the segment update(s) in the block to the tape log module 52 for recording on the respective tape log sets maintained thereby. In particular, when a segment update reaches the head of the block queue 70, if no more recent segment update has been received by the filter/buffer module 51 and enqueued with the block queue 70, the filter/buffer module 51 will provide the segment update to the tape log module 52 for recording. As will be described below in connection with FIGS. 6, 10 and 11, for each segment update received by the tape log module 52, the tape log module 52 in turn will store the segment update on the tape log set which is used to store segment updates for the particular protected volume with which the segment update is associated.

On the other hand, for each segment update for a segment, for which a more recent segment update has been received by the filter/buffer module 51 and enqueued with the block queue 70, the filter/buffer module 51 will discard the earlier-received segment update, and not provide it to the tape log module for recording. As will be described below in greater detail, the filter/buffer module 51 will provide segment updates which reach the head of the block queue 70 to the tape log module 52 for recording, and so, if the later-received segment update reaches the head of the block queue 70 before the filter/buffer module 51 receives a yet later segment update for the segment, the filter/buffer module 51 will provide that later-received segment update to the tape log module 52 for recording. On the other hand, if a yet later segment update is received, when the "later-received segment update" reaches the head of the block queue 70, that "later received segment update" will also be discarded.

The segment identifier hash table 71 is used to identify the particular block of the block queue 70 which contains the most recently received segment update for each segment for which a segment update is contained in a block of the block queue 70. Thus, when the filter/buffer module 51 is to determine whether a segment update contained in a block of the block queue 70 is the most recently received update, prior to providing the segment update to the tape log module 52 for storage, it (that is, the filter/buffer module 51) will determine whether the segment identifier hash table identifies the block as containing the most recently-received segment update. On the other hand, if the segment identifier hash table 71 indicates, for a segment update in a block, that an updated copy of the segment update is stored in another block in the filter/buffer module 51, that particular segment update in the block will not be passed to the tape log module 52 for storage. This will occur for each segment update in each of the blocks in the block queue 70, and so the filter/buffer module 51 will ensure that each block preferably remains in the queue for a period of time that is sufficiently long that it is likely that, if the digital data processing system 10(n) updates the information contained in the segment again within some time after an update is stored in the queue, it will be superseded or filtered out before the update is stored by the tape log module 51. In one embodiment, the time that a block remains in the block queue 70 is controlled to some extent by providing that the block queue 70 will have at least a minimum number of blocks prior to providing segment updates to the tape log module 52. This filtering will serve to reduce the number of segment updates associated with a particular segment (that is, which are associated with a particular segment identifier) which are stored by the tape log module 52 if the digital data processing system 10(n) modifies the record several times within a relatively short period of time.

More specifically, the block queue 70 contains the various blocks that are generated by the block generators 61(n) and provided to the filter/buffer module 51. Block queue 70 comprises a block queue header 74 and a series of one or more block queue elements 75(l) through 75(B) (generally identified by reference numeral 75(b)), with block queue element 75(l) comprising the "head" of the block queue 70 and block queue element 75(B) comprising the "tail" of the block queue 70. The block queue header 74 includes two fields, including a head pointer field 80 and a tail pointer field 81, with the head pointer field 80 pointing to the head block queue element 75(l), and the tail pointer field 81 pointing to the tail block queue element 75(B). Each successive block queue element 75(l) through 75(B−1) points to the next block queue element in the series of block queue elements comprising the block queue 70, thereby to define and establish the series of block queue elements defining the block queue 70. The tail block queue element 75(B) may contain a null or other value which indicates that it is the last block queue element in the block queue 70.

Each block queue element 75(b), in turn, comprises a queue element header 76 and a block 77. The queue element headers 76 of the respective block queue elements 75(b) essentially serve to define the order of the block queue elements 75(b) essentially serve to define the order of' the block queue elements 75(b) in the block queue 70 and identify the respective blocks that are associated with the queue 70. The block 77 associated with each queue element header 76 generally corresponds to one of the blocks that is generated by the block generator 61(n) of the interface 50 (FIG. 4). Each queue element header 76 includes several fields, including at least a next block pointer field 82 and a block pointer field 84. The next block pointer field 82 in header 76 of a block queue element 75(b) contains a next block pointer to the next block queue element 75(b+1) in the block queue 70, and thus the next block pointers effectively serve to define the order of the block queue 70 as described above.

The block pointer field 84 includes a block pointer that points to the block 77 that is associated with the block queue element 75(b). In the embodiment in which the filter/buffer module 51 buffers the information received for the protected volumes in a disk storage device, the block pointer will preferably comprise the address of the storage location in the disk drive unit in which the block 77 is stored; it will be appreciated, however, that if other storage media, such as conventional random access memories, are used to store the information, the block pointer in field 84 will generally contain an address that identifies the location in the storage media in which the block 77 is stored.

Block 77, which, as indicated above, is pointed to by the block pointer 84, includes one or more entries 85(l) through 85(R)(generally identified by reference numeral 85(r)), with each entry 85(r) being associated with one segment update loaded into the block by the block generator 61(n). Each entry 85(r), in turn, includes a number of fields, including a segment identifier field 90, a segment length field 91, and a segment update information storage field 93. The actual segment update is stored in the segment update information storage field 93. The segment identifier field 90 receives the segment identifier for the segment update. As indicated above, the segment update can be of variable length, and the segment length field 91 stores a segment length value that identifies the length of the segment update. As described above, the segment update can be either a full segment or a partial segment, and it will be appreciated that, in addition to helping identify the beginning of the next entry 85(r) in the block 77, the segment length value in the segment length field 91 can also be used do indicate whether the segment update stored in the entry 85(r) comprises a partial segment or a full segment.

As indicated above, the filter/buffer module 51 also provides a source of queue elements (not shown). The queue element source may be in the from of, for example, a queue, which buffers unused queue elements until they are required for use in the block queue 70. Thus, when a new block queue element is required for a new block received by the filter/buffer 51 from a block generator 61(n) of input 50, the queue element will be provided by the queue element source for use in establishing a block queue element 75(b). In addition, when segment updates from a block 77 associated with a block queue element 75 have been either transferred to the tape log module 52 for storage or discarded, the queue element 75(b) is returned to the queue element source.

As noted above, the filter/buffer module 51 also includes the segment identifier hash table 71 which identifies the block queue elements 75(b), and thus the blocks 77, which contain the most recently received segment updates. The record identifier hash table 71 includes a selected number of pointer entries 110(l) through 110(H)(generally identified by reference numeral 110(*h*)) which point to respective linked lists 111(*h*), with each index "h" representing a hash value which may be generated by applying a selected hash function to the segment identifiers for the various segment updates that may be received by the remote data protection facility 5 from the digital data processing systems 10(*n*). Each pointer entry 110(*h*) contains a pointer that points to the correspondingly-indexed linked list 111(*h*).

Each linked list 111(*h*), in turn, can comprise one or more list entries 111(*h*)(*l*) through 111(*h*)(*J*)(generally identified by reference numeral 111(*h*)(*j*) which are associated with a various segment updates for the various segments whose segment identifiers hash to the hash value corresponding to the index "h." Each entry in list 111(*h*) comprises a number of fields, including a segment identifier field 112, a block queue entry pointer field 113 and a next hash entry pointer field 114. When a new block 77 is received from the block generator 61(*n*) and used in a new block queue element 75(*b*), for each segment update in the block, a hash function is applied to the segment update's segment identifier to provide a hash value "h," which is used as an index to identify a pointer entry 110(*h*) in the segment identifier hash table 71. If the pointer entry 110(*h*) contains a null or other value that indicates that there is no list 111(*h*) associated with the pointer entry 110(*h*), which can occur if the block queue 70 does not contain any blocks 77 which, in turn, contain segment updates whose segment identifier hashes to the entry's index value "h," a list 111(*h*) will be established by creating a new list entry 111(*h*)(*l*) for the segment update. In addition, the segment identifier for the segment update will be loaded into the segment identifier field 112, and a block pointer loaded into the block queue entry pointer field 113 to point to the block 77 of the block queue 70 that contains the sent update. In addition, a null or other value may be provided in the next hash entry pointer field 114 to indicate that the entry is the last entry 111(*h*)(*J*) in the list 111(*h*).

On the other hand, if the pointer entry 110(*h*) contains a pointer to a list 111(*h*), the list 111(*h*) contains one or more entries 111(*h*)(*j*) whose segment identifier values hash to the index value "h." One of the entries 111(*h*)(*j*) in that list may contain a segment identifier field 112 which contains a segment identifier that corresponds to the segment update's segment identifier. In that case, the entries 111(*h*)(*j*) in the list 111(*h*) can be scanned to determine whether it contains an entry for which the segment identifier field 112 contains a segment identifier value that corresponds to the segment identifier for the new segment update. If so, the block pointer field 113 for that entry 111(*h*)(*j*) can be updated to point to the new block, which, in turn, will ensure that the segment identifier hash table 71 will always point to the block 77 which contains the most recently received segment update for a particular segment identifier. On the other hand, if the list 111(*h*) does not contain an entry 111(*h*)(*j*) for which the segment identifier field 112 contains a segment identifier value that corresponds to the segment identifier for the new segment update, a new entry 111(*h*)(*j*) can be added to the list 111(*h*) in a manner similar to that described above, and linked to the list 111(*h*) by loading a pointer pointing to the new entry 111(*h*)(*j*) in the next pointer field 114 of the last entry in the list 111(*h*).

As described above, the filter/buffer 51 also includes a control module 73 to control the block queue 70 and the segment identifier hash table 71 to receive blocks from the input module 50, establish block queue elements 75(*b*) therefore, and selectively transfer segment updates from the block queue 70 to the tape log module 52 for storage. In addition, the control module 73 will determine whether segment updates stored in the block queue elements 75(*l*) are partial segments and, if so, will enable a request to be transmitted to the remote data protection facility interface 17 of the appropriate digital data processing system 10(*n*)(FIG. 1) to initiate the retrieval of the corresponding full segments. Preferably, for each such partial segment in the block queue 70, the control module 73 will issue a request for the corresponding full segment so that it would normally receive the full segment before the block queue element containing the partial segment reaches the head of the block queue. It will be appreciated description that, when the full segment is received, the entry 111(*h*)(*j*) in the segment identifier hash table will be updated to point to the block queue entry 75(*b*) which contains the full segment, in which case the partial segment will be discarded and not passed to the tape log module 52 for storage. In one embodiment, if the full segment is not so received, the partial segment will not be passed to the tape log module 52 (in that embodiment, only full segments are stored by the tape log module 52), but instead the remote data protection facility 5 marks the segment as being invalid and will not be reconstructed by the reconstruction module 53 during a reconstruction operation.

Generally, the control module 73, when a block 77 is received from a block generator 61(*n*), forms a block queue element 75(*b*) and enqueues it (that is, the block queue element) to the block queue. In those operations, in response to receipt of a block from a block generator 61(*n*), the control module 73 will:

(a) retrieve a queue element from the queue element source, generate a block queue element and link the generated block queue element as the tail block queue element 75(B) for the block queue 70, and (b) update the segment identifier hash table 71 to enable the respective entries of the lists 111(*h*) whose segment identifiers identify the segment updates in the new tail block queue element 75(B) to point to the new tail block queue element 75(B).

In generating a block queue element and linking it as the tail block queue element 75(B)(item (a) above), the control module 73 will update both (i) the tail pointer 81 of the block queue's block queue header 74 and (ii) the next block pointer 82 of the block queue element which was previously at the tail of the block queue 70, to point to the new tail block queue element 75(B). The control module 73 will also condition the block queue header 76 of the new tail block queue element 75(B), in particular, (i) providing an appropriate value as the next block pointer 82, which, as noted above, may illustratively comprise a null value); and (ii) providing a pointer for the block pointer field 84 which points to the new block 77. The control module 73 will perform these operations for each of the blocks received from the block generator 61(*n*) of the input module 50 (FIG. 4)

As indicated above, the filter/buffer module 51 preferably maintains at least a minimum number of block queue elements 75(*b*) in the block queue 70 to ensure that the block queue elements 75(*b*), and thus the segment updates stored therein, will remain in the filter/buffer module 51 for at least some time before they are transferred to the tape log module 52 for storage. Thus, while the block queue 70 contains at least the required minimum number of block queue elements 75(*b*), the control module 73 will selectively provide the segment updates from entries 85(*r*) of the head block queue element 75(*l*) to the tape log module 52 for storage on the appropriate tape log set. In that operation, the control module 73, for each entry 85(*r*) of the block 77 contained in the head block queue element 75(*l*), will determine whether the segment update contained in the entry is the most recently received segment update for the segment.

In making that determination, the control module 73 will, in turn, use the selected hash function as described above to generate the hash value "h" for the segment identifier in field 90 of the entry 85(*r*) and determine whether the list 111(*h*) associated with that hash value "h" in the segment identifier hash table 71 contains an entry whose block pointer 113 points to the head block queue element's block 77. If the control module 73 determines that the list 111(*h*) associated with that hash value "h" in the segment identifier hash table 71 contains an entry whose block pointer 113 points to the head block queue element's block 77, it can determine that the segment update contained in the entry 85(*r*) is the most recently-received segment update for the segment identified in field 90, and provide that entry 85(*r*) to the tape log module 52 for storage. On the other hand, If the control module 73 determines that the list 111(*h*) associated with that hash value "h" in the segment identifier hash table 71 contains an entry whose block pointer 113 points to the block 77 of a different queue entry 75(*b*)(b≠l), it can determine that the segment update contained in the entry 85(*r*) is not the most recently-received segment update for the segment identified in field 90, and discard that entry 85(*r*).

Figure 8A:
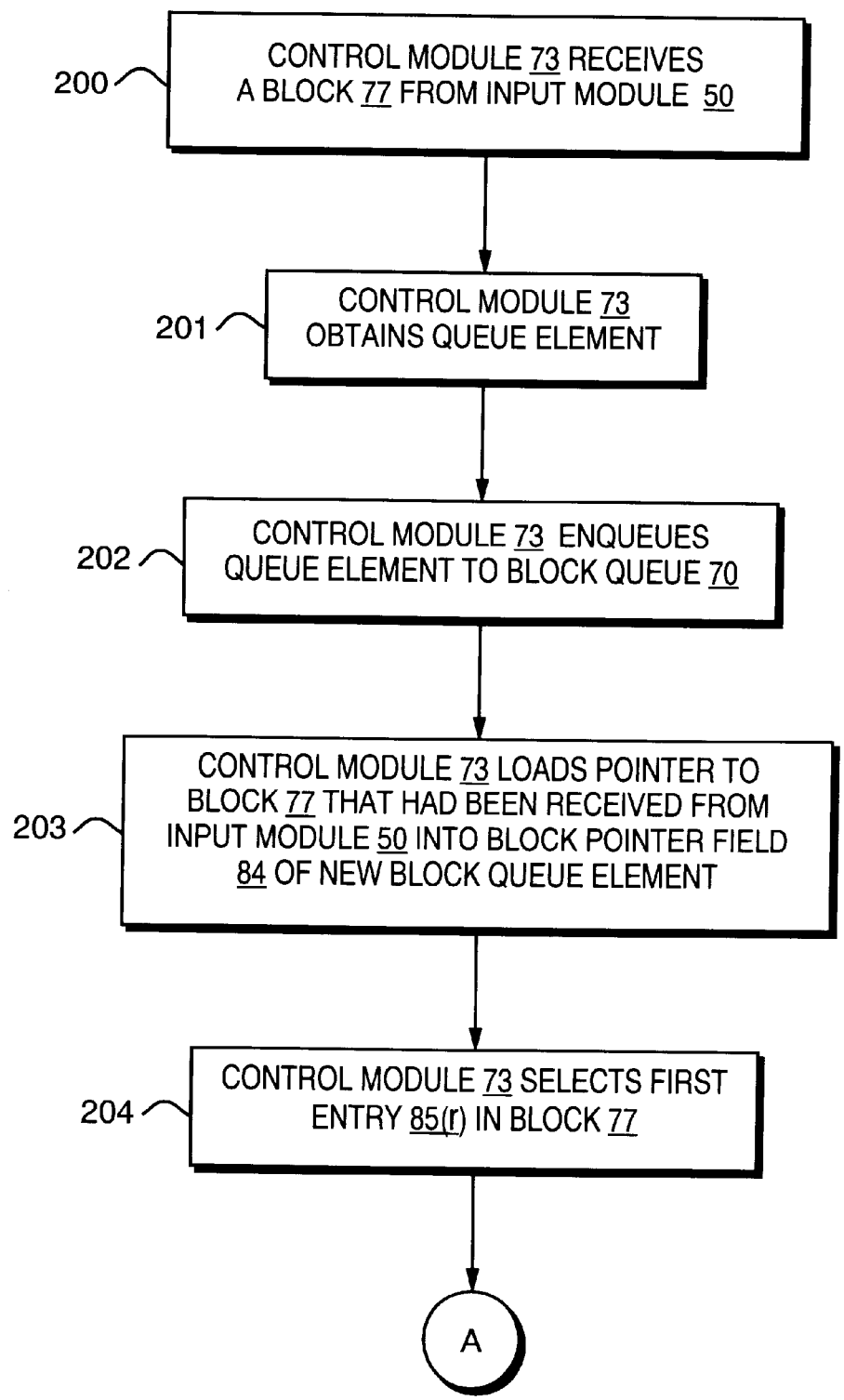
FIGS. 8, 8A, and 8B and 9, 9A, and 9B are a flow charts detailing operations performed by the filter/buffer module's control module in controlling the filter/buffer module depicted if FIG. 5.
Figure 8B:
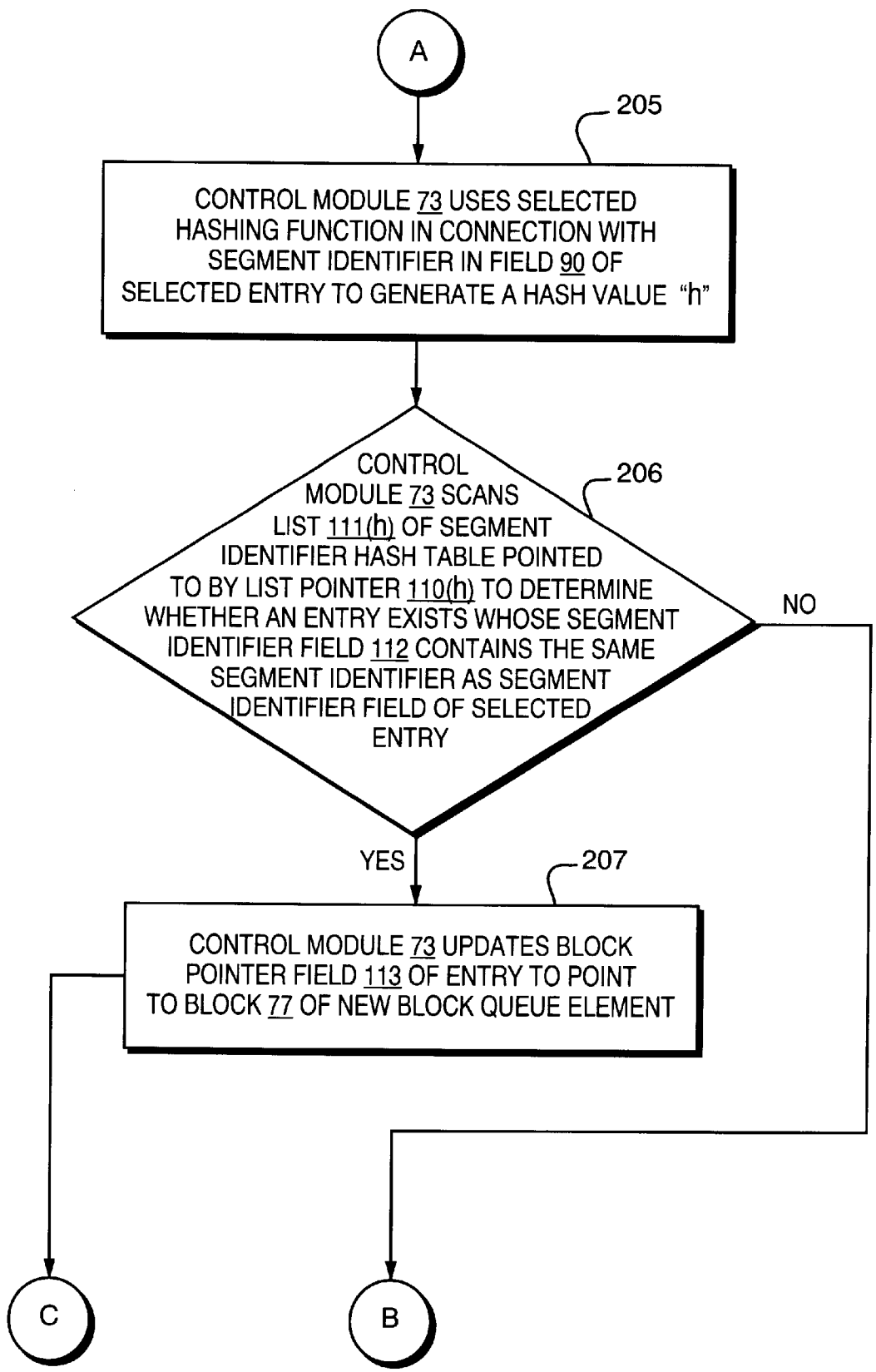
Figure 8C:
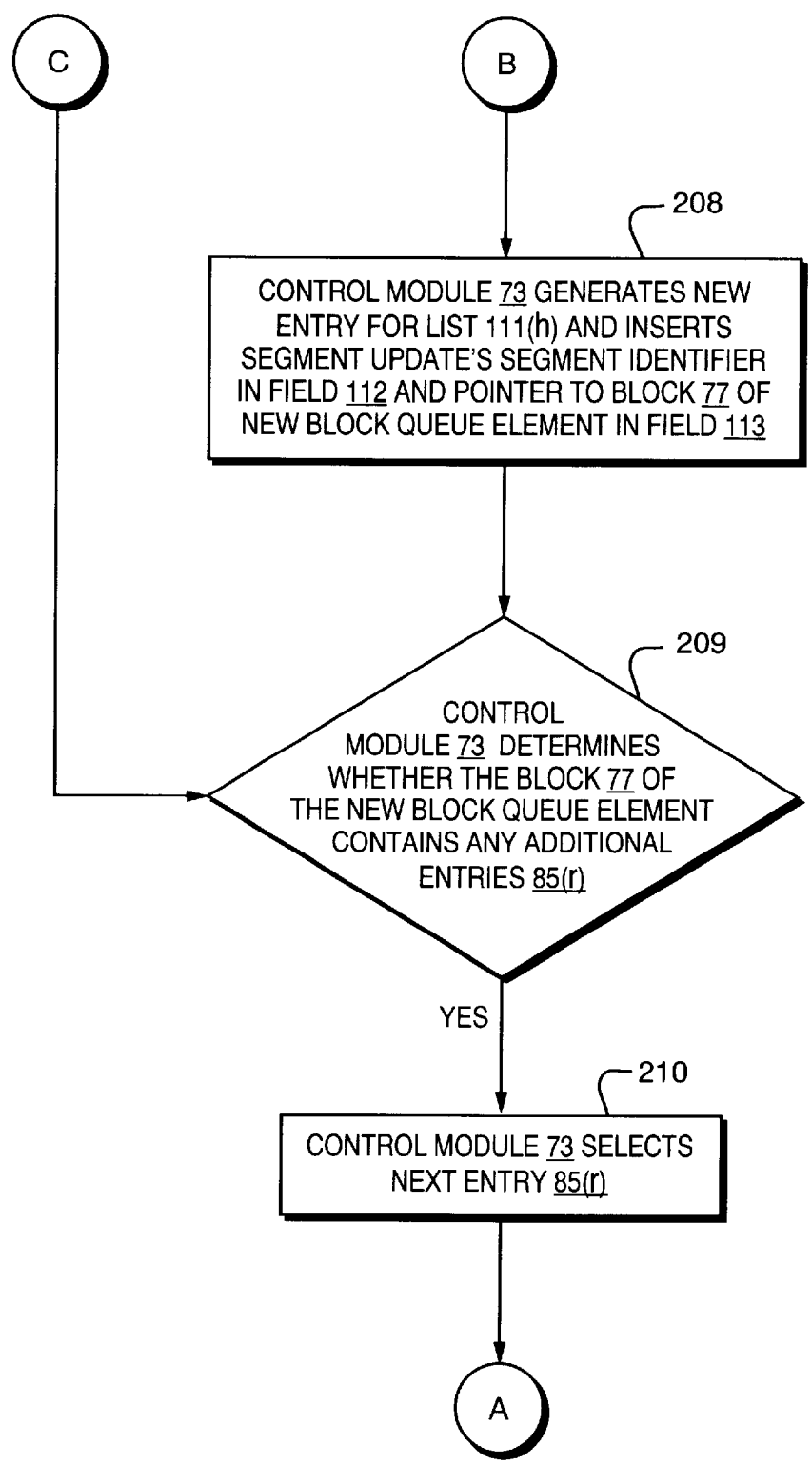
Figure 9A:
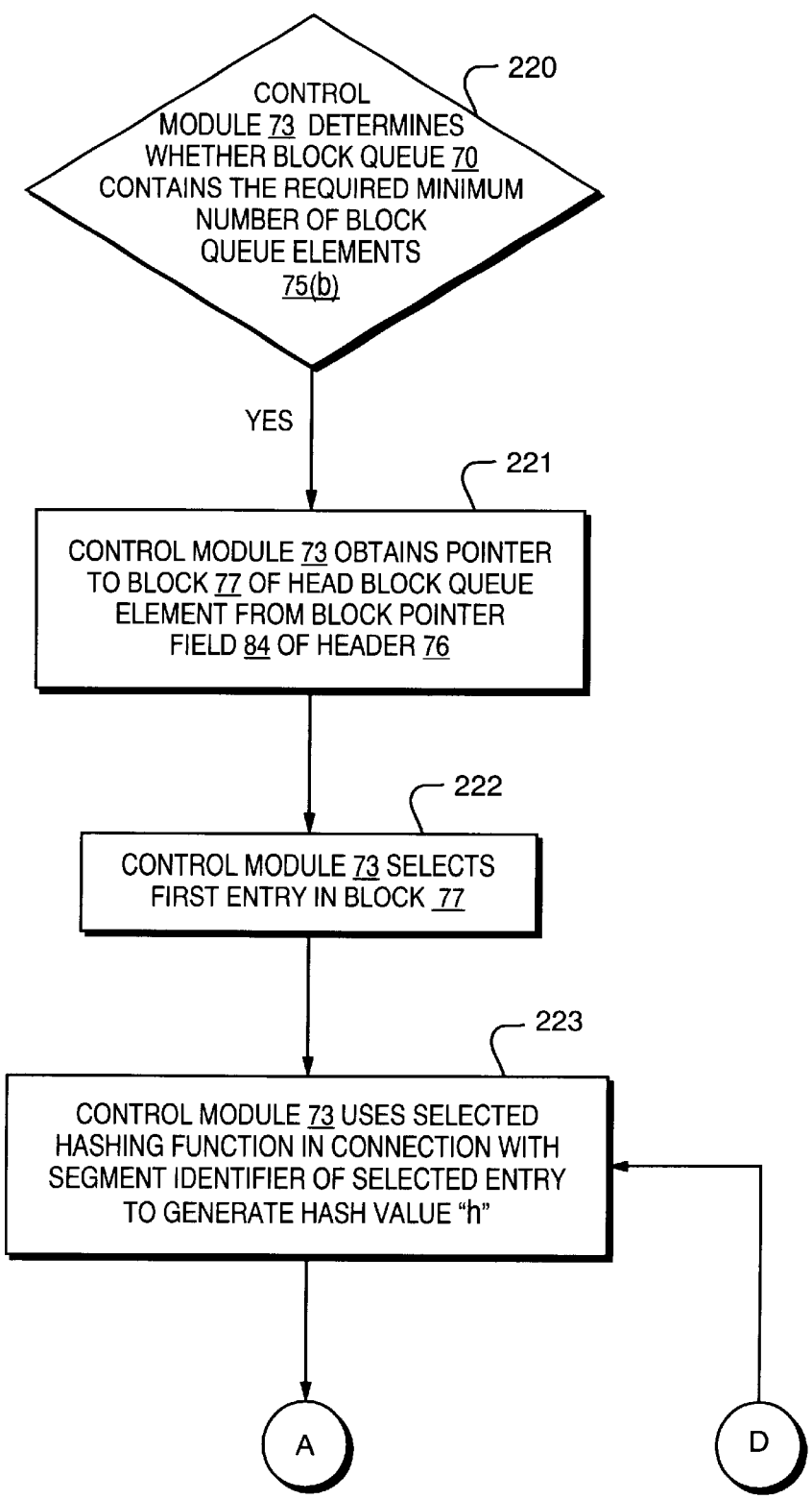
Figure 9B:
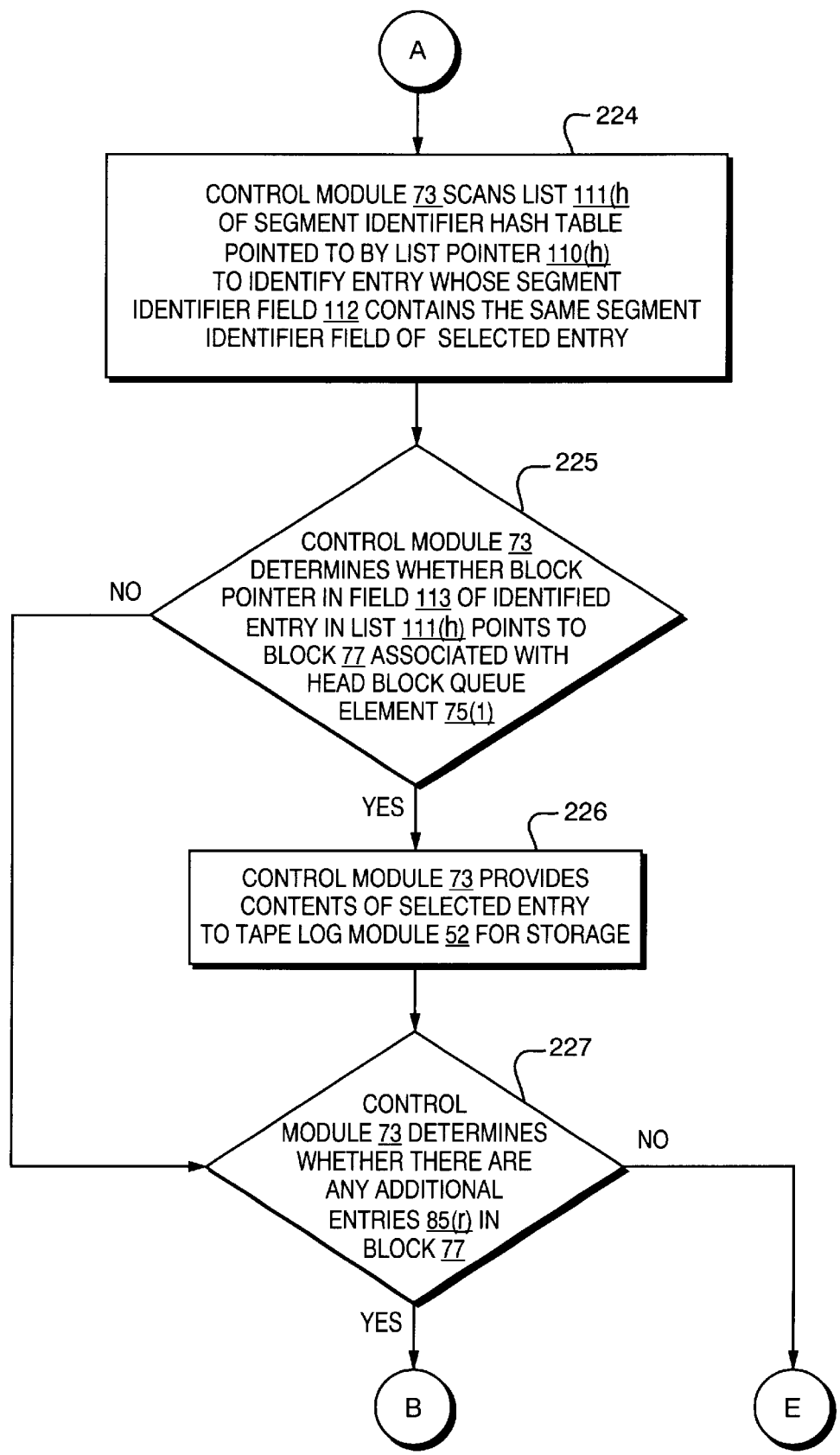
Figure 9C:
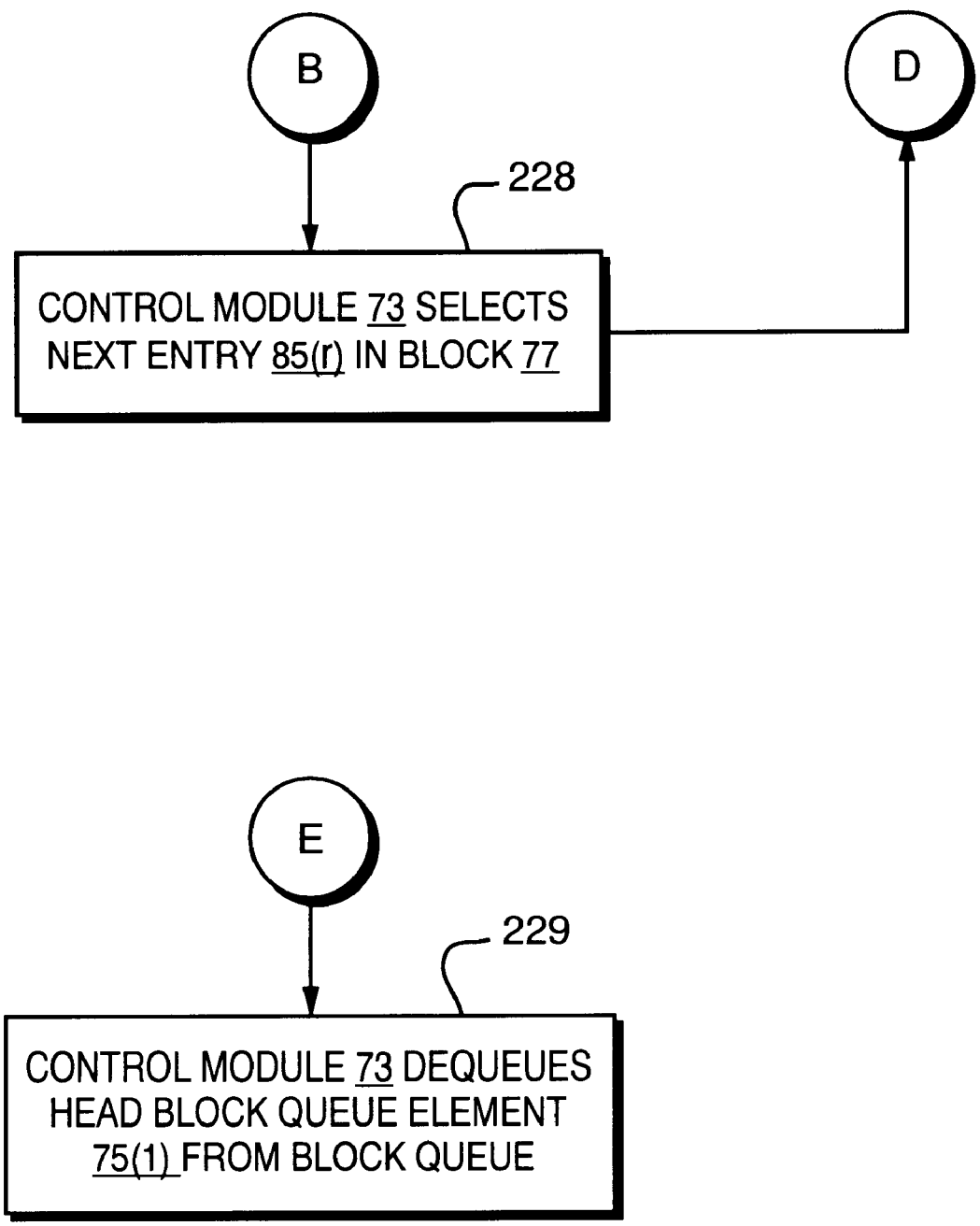

With this background, the detailed operations enabled by the control module 73 will be described in connection with the flow charts depicted in FIGS. 8 and 9, with FIG. 8 depicting operations performed by the control module 73 when a block is received from the input module 50, and FIG. 9 depicting operations performed by the control module 73 in connection with transferring of entries 85(*r*) from the head block queue element 75(*l*) to the tape log module 52. With reference initially to FIG. 8, the control module 73 will (i) receive a block 77 from the input module 50 (step 200);

(ii) retrieve a queue element from the queue element source (step 201);

(iii) enqueue the queue element, which was retrieved in step 201, to the block queue 70 (step 202), in the process updating the next block pointer field 82 of the current tail block queue element 75(B) and the tail pointer 81 of the header 74 of the block queue; and (iv) load a pointer to the block 77 received from the input module 50 into the block pointer field 84 (step 203) thereby to link the block 77 to the tail block queue element 75(B).

Thereafter, the control module 73 will update the segment identifier hash table for each of the entries 85(*r*) in the block 77 of the new queue element, and in those operations will:

(v) select the first entry 85(*r*) in the block 77 (step 204), (vi) use the selected hashing function in connection with the segment identifier in field 90 of the selected entry to generate a hash value "h" (step 205); and (vi) scan the list 111(*h*) of the segment identifier hash table 71 pointed to by list pointer 10(*h*), to determine whether an entry exists whose segment identifier field 112 contains the same segment identifier as the segment identifier field 90 of the selected entry 85(*r*)(step 206).

(vii) If the control module 73 makes a positive determination in step 206, it will update the block pointer field 113 of the entry to point to the block 77 of the new block queue element (step 207), but (viii) if the control module makes a negative determination in step 206, it will generate a new entry for the list 111(*h*) and insert the segment update's segment identifier in segment identifier field 112 and a pointer to the block 77 of the new block queue element in block pointer field 113 of the new entry (step 208)

(ix) Thereafter, the control module 73 will determine whether the block 77 of the new block queue element contains any additional entries 85(*r*)(step 209), and (x) in response to a positive determination in step 209, select the next entry 85(*r*)(step 210) and return to step 205 to process that entry.

FIG. 9 depicts operations performed by the control module 73 in connection with transferring of entries 85(*r*) from the head block queue element 75(*l*) to the tape log module 52. In connection with those operations, the control module 73 will:

(i) determine whether the block queue 70 has the required minimum number of block queue elements 75(*b*)(step 220);

(ii) in response to a positive determination in step 220, obtain the pointer to the block 77 associated with the head block queue element 75(*l*) from block pointer field 84 of the head block queue element's block queue header 76 (step 221);

(iii) select the first entry 85(*r*) in the block 77 pointed to by the pointer obtained in step 221 (step 222);

(iv) use the selected hashing function in connection with the segment identifier in field 90 of the selected entry to generate a hash value "h" (step 223);

(v) scan the list 111(*h*) of the segment identifier hash table 71 pointed to by list pointer 110(*h*), to identify the entry of list 111(*h*) whose segment identifier field 112 contains the same segment identifier as the segment identifier field 90 of the selected entry 85(*r*)(step 224); and (vi) determine whether the block pointer in field 113 of the identified entry in list 111(*h*) points to the block 77 associated with the head block queue element 75(*l*) (step 225).

(vii) In response to a positive determination in step 225, the control module 73 will provide the contents of the selected entry 85(*r*), including the segment identifier in field 90, the segment identifier in field 91 and the segment update in field 93, to the tape log module 52 for storage (step 226).

It will be appreciated that, if the control module 73 makes a positive determination in step 225, the entry in list 111(*h*) whose segment identifier in field 112 corresponds to the segment identifier in the entry 85(*r*) points to the block 77 associated with the head block queue entry 75(*l*). In that case, as described above, the head block queue entry 75(*l*) contains the most recently-received segment update for the segment identifier, and so the control module 73 enables the segment update and associated information in entry 85(*r*) to be transferred to the tape log module 52 for storage.

Following step 226, or step 225 if the control module 73 makes a negative determination in that step, the control module 73 will (viii) determine whether there are any additional entries 85(*r*) in the block 77 (step 227), and (ix) in response to a positive determination in step 226, select the next entry 85(*r*)(step 228) and return to step 223 to initiate processing in connection with that entry 85(*r*).

It will be appreciated that, if the control module 73 makes a negative determination in step 225, the entry in list 111(*h*) whose segment identifier in field 112 corresponds to the segment identifier in the entry 85(*r*) does not point to the block 77 associated with the head block queue entry 75(*l*). In that case, as described above, another block queue entry 75(*b*) will contain a more recent segment update for the same segment identifier, and so the control module 73 selects the next entry 85(*r*) in the block, if such an entry exists, and processes that entry. As a result, the control module 73 will effectively discard the contents of the previously-selected entry 85(*r*).

(xii) Returning to steps 227, if the control module makes a positive determination in those steps, it will effectively dequeue the head block queue element 75(*l*) from the block queue 70 and provide it to the queue element source (step 229).

As will be described below in connection with FIG. 6, the tape log module 52 includes a plurality of tape log sets, each of which is provided with an input queue in which is enqueued segment updates which will be recorded onto tape cartridges in the respective tape log set. In performing step 226, the control module 73 can enqueue the selected entry 85(*r*) to the input queue that is associated with the tape log set associated with the protected volume from which the segment update was received.

D. Tape Log Module 52

The tape log module 52 (FIG. 1) receives the segment updates passed thereto by the filter/buffer module 51 and stores them on the appropriate tape log sets associated with the respective protected volumes. The tape log module 52 will be described in connection with FIG. 6, which depicts elements of the tape log module 52. One tape log set, identified by reference numeral 130, and associated elements are depicted in FIG. 6. As described above, in one embodiment the tape log module 52 comprises a plurality of tape log sets, each of which will be provided with a number of the elements depicted in FIG. 6 as described below.

Generally, the tape log module 52 performs two general types of operations, namely, (i) a storage operation, in which segment update information provided thereto by the filter/buffer module 51 is stored on a tape cartridge of the tape log set 130; and (ii) a "space reclamation" operation, in which selected "valid" segment updates are copied from one tape cartridge of a log set 130 to another cartridge of the same log set, after which the tape cartridge from which the valid segment updates were copied is deemed empty.

Operations performed by the tape log module 51 in connection with each of these will be described in connection with FIGS. 6, 10 and 11.

Generally, in performing a storage operation (item (i) above) the tape log module 52 will store each segment update that it receives from the filter/buffer module 51 on tape cartridges of the appropriate tape log set, that is, the tape log set to which the protected volume associated with the segment update is assigned. At any particular point in time, one tape cartridge of a tape log set 130 will be selected as a "current logging tape cartridge" onto which segment updates will be stored, and when the current logging tape cartridge is full, another tape cartridge from the same log set 130 will be selected as the current logging tape cartridge.

In performing a space reclamation operation (item (ii) above), the tape log module 52 will copy "valid" segment updates, that is, the most recently received segment updates for their respective segments, from one tape cartridge in the tape log set 130, as a "source" cartridge during the space reclamation operation, onto one or more of the other tape cartridges in the tape log set. Preferably, the valid segment updates from the space reclamation source cartridge will be copied onto the current logging tape cartridge used for the storage operation (item (i) above). Indeed, the tape log module 52 will perform a space reclamation operation (item (ii) above) concurrently with a storage operation (item (i) above) and the valid segment updates from the space reclamation source cartridge will be stored on the current logging tape cartridge interleaved with the segment updates from the filter/buffer module 51. As indicated above, in one embodiment the tape log module provides nine drives for storing information on and retrieving information from the tape cartridges, with one drive normally being used with each of the eight log sets. In that embodiment, the ninth drive is normally used to retrieve segment updates from a space reclamation source cartridge during a space reclamation operation.

After a tape cartridge has undergone a space reclamation operation as a source cartridge, it will be deemed empty and can be used as a current logging tape cartridge during a storage operation (item (i) above). Preferably, the tape log module 52 will select a tape cartridge in the log set 130 to undergo a space reclamation operation as a source cartridge when the number of empty tape cartridges falls below a predetermined threshold number. In addition, preferably the tape log module 52 will select as the source cartridge the cartridge which contains the least number of valid segment updates. Operations performed by the tape log module 52 in selecting a cartridge to be a source cartridge in a space reclamation operation, and in identifying the ones of the segment updates on the selected source cartridge which are valid, will be described in detail below.

With this background, the structure of the tape log module 52 will be described in connection with FIG. 6. With reference to FIG. 6, the tape log module 52 includes, in addition to the tape log sets, an input queue 132 associated with each tape log set for buffering segment updates to be stored on the respective tape log set 130. In addition, the tape log module 52 provides several data structures which identify the segment updates stored on the various tape cartridges of the respective tape log sets 130 and which can be used in identifying valid segment updates during a space reclamation operation and a reconstruction operation. The various elements of the tape log module 52 all operate under control of a tape log control module 135. The tape log module 52 may make use of a pool of queue elements (not shown), similar to the queue element source used with the filter/buffer module 51 as described above, which will provide queue elements which will be used as described below.

Generally, the element identified as the tape log set 130 represents the tape cartridges used in the log set, the drives used to record information on and retrieve information from the tape cartridges, and any electronic circuitry which is used in connection therewith. Each tape log set 130 includes a number of tape cartridges 136(*l*) through 136(M)(generally identified by reference numeral 136(*m*)) can be used variously for storing segment updates during a storage operation (item (i) above) and as a space reclamation source cartridge during a space reclamation operation (item (ii) above).

The input queue 132 associated with a tape log set 130 provides buffering for segment updates to be stored on the tape log set 130, including both segment updates provided by the filter/buffer module 51 and those valid segment updates which are retrieved from a space reclamation source cartridge during a space reclamation operation. The input queue 132 comprises a plurality of input queue elements 132(*i*), each of which stores the segment update, identifier and length information for one segment update received from the filter/buffer module 51 for storage on the tape log set 130, or corresponding information retrieved from a space reclamation source cartridge during a space reclamation operation. Each input queue element 132(*i*) also provides an identifier (not separately shown) which identifies the source of the information contained in the input queue element, that is, whether the information was received from the filter/buffer module 51 or a space reclamation source cartridge. In addition, the input queue 132 provides queue header structures similar to those provided by header 74 for the block queue 70 (FIG. 5), and each input queue element 132(*i*) also includes queue element header structures similar to those provided by header 76 for the respective block queue element 75(*b*)(FIG. 5).

As noted above, the tape log module 52 provides a number of data structures which identify the segment updates stored on the various tape cartridges of the respective tape log sets 130 and which can be used in identifying valid segment updates during a space reclamation operation and a reconstruction operation. The data structures include, for each tape cartridge 136(*m*) in the tape log set, a cartridge segment directory 141(*m*) and a segment bit map 142(*m*) which are used both during a space reclamation operation and a reconstruction operation. In addition, the tape log module 52 includes an auxiliary segment bit map 143 which is used during a space reclamation operation.

Figure 6:
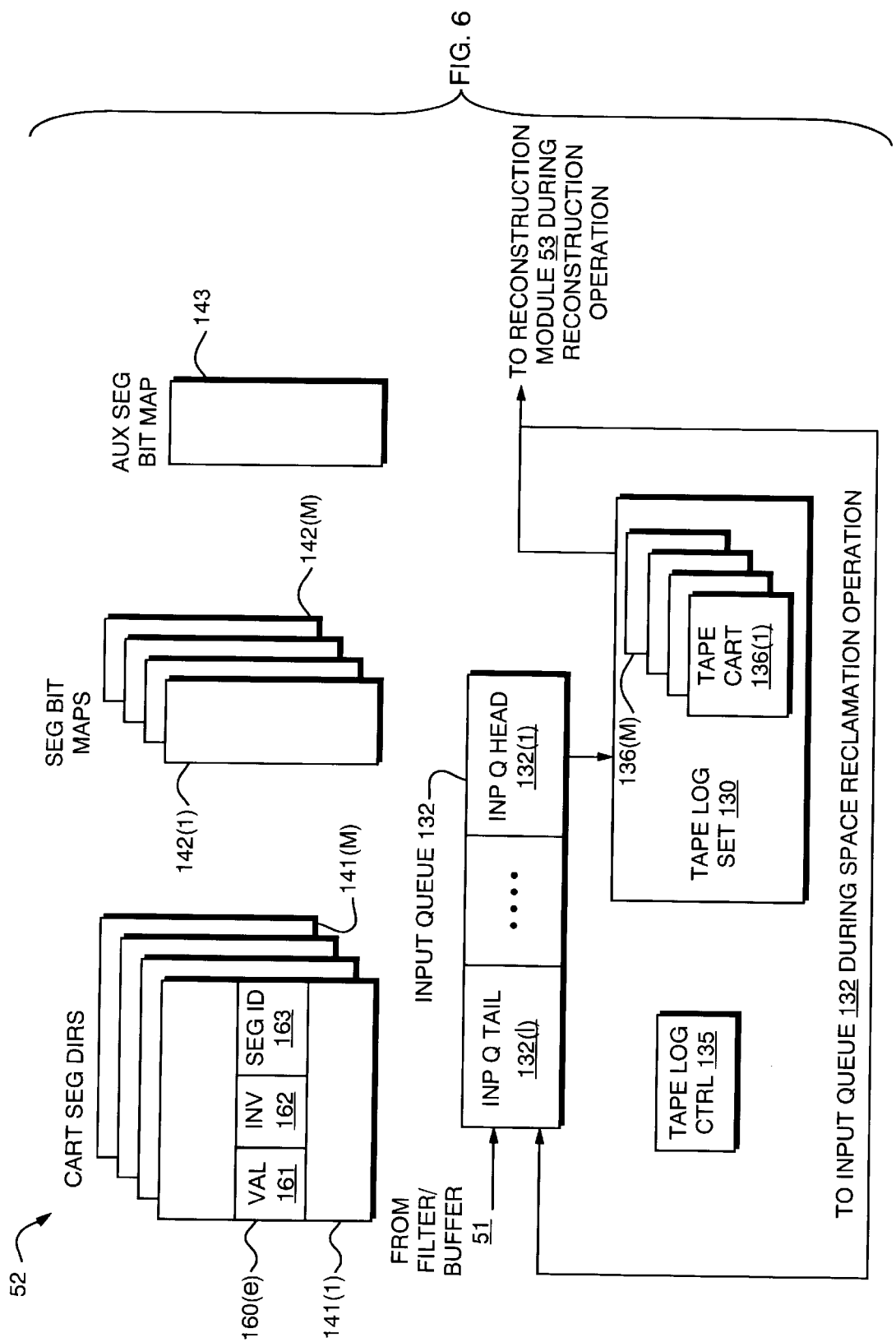
FIG. 6 is a functional block diagram of a tape log module useful in the remote data protection facility depicted in FIG. 1.

As shown in FIG. 6, the cartridge segment directory 141(*m*) includes a series of entries generally identified by reference numeral 160(*e*), which are generally associated with respective ones of the series of segment updates that are recorded on the associated tape cartridge of the tape log set 130. Thus, the "e-th" entry of the cartridge segment directory 141(*m*) is associated with the "e-th" segment update that is recorded on the tape cartridge 136(*m*) associated with the cartridge segment directory 141(*m*). Each directory 141(*m*) identifies the series of records that are stored on the tape cartridge, as well as their valid and invalid status, that is, whether each is the most recently received segment update for the segment and thus will survive space reclamation when the associated cartridge is selected as a space reclamation source cartridge. Each entry 160(*e*) includes three fields, including a valid flag 161, an invalid flag 162 and a segment identifier field 163. For the respective entry 160(*e*), the valid and invalid flags 161 and 162 are conditioned indicate the valid or invalid status of the segment update as recorded on the tape cartridge 136(*m*) associated with the cartridge record directory 141(*m*). The segment identifier field 163 contains a segment identifier value, and identifies the segment that is associated with the entry 160(*e*). As will be apparent below, the cartridge segment directory 141(*m*) will not need to identify the specific location on the tape cartridge 136(*m*) at which each segment update is recorded on the tape cartridge.

As indicated above, the valid and invalid flags 161 and 162 of the respective entries 160(*e*) of the cartridge segment directory 141(*m*), along with the segment bit maps 142(*m*), are used to identify the valid segment updates for the various segments that are stored on the tape log set 130. In addition, the auxiliary segment bit map 143 is used during a space reclamation operation to assist in identifying ones of the segment updates from the space reclamation source cartridge which are invalid.

In particular, each segment bit map 142(*m*) includes a plurality of bits each associated with one of the possible segment identifiers for which segment updates may be stored on the tape cartridges in the log set 130. For each tape cartridge 136(*m*), the associated segment bit map 142(*m*) identifies the segment identifiers for the valid segment updates that are stored on the tape cartridge 136(*m*). Thus, when a segment update for a particular segment is stored on a tape cartridge 136(*m*) during a storage operation, if the segment update is valid, the bit of the associated segment bit map 142(*m*) associated with the segment will be normally be set to indicate that cartridge 136(*m*) contains a valid segment update and corresponding bits in the segment bit maps 142(*m*')(*m*'≠*m*) associated with other tape cartridges 136(*m*') (*m*'≠*m*)will be cleared to indicate that segment updates for the segment that may be stored on those cartridges 136(*m*') (*m*'≠*m*)are invalid.

It will be appreciated that, if the cartridge 136(*m*) contains multiple segment updates for the segment, the segment bit map 142(*m*) does not identify the particular segment update for the segment which is valid. As will be described in more detail below, if the tape cartridge 136(*m*) contains multiple segment updates for a particular segment identifier, the particular segment update that is valid is the segment update that is associated with the last entry 160(*e*) of the cartridge segment directory 141(*m*) for which the invalid flag 162 is not set. Thus, to identify the segment updates from a space reclamation source cartridge 136(*s*) which are to be selected for copying during a space reclamation operation, the cartridge segment directory 141(*s*) associated with the source cartridge 136(*s*) can be processed in reverse order, from the last entry 160(E) to the first entry 160(*l*) to identify the last entry 160(*e*) in the directory 141(*m*) whose invalid flag 162 is not set for each segment whose bit is set in the segment bit map 142(*m*). The valid flags for the identified entries 160(*e*) will then be set to, in turn, identify the particular entries which are associated with segment updates which are candidates for retrieval from the space reclamation source cartridge 136(*s*).

After the segment updates which are candidates for retrieval from the space reclamation source cartridge 136(*s*) have been identified as described above, the space reclamation source cartridge can be loaded into a drive and segment updates, along with associated segment identifier and length information, retrieved therefrom. The valid segment updates can thereafter be selectively used to generate input queue elements 132(*i*) which can be enqueued to the input queue 132 for storage on the current logging tape cartridge 136(*l*). In that operation, in addition to the cartridge segment directory 141(*s*) associated with the space reclamation source cartridge 136(*s*), the auxiliary segment bit map 143 will also be used in determining whether input queue elements 132(*i*) are to be generated for the valid segment updates that are retrieved.

As with the segment bit maps 142(*m*), the auxiliary segment bit map 143 comprises a series of bits each associated with one of the possible segment identifier values. At the beginning of a space reclamation operation, the auxiliary segment bit map 143 is established and initialized, and at the end of a space reclamation operation the auxiliary segment bit map 143 that was used during the operation may be discarded. During a space reclamation operation, when a segment update that is received from the filter/buffer module 51 is stored on any cartridge 136(*m*) in the tape log set, the particular bit of the auxiliary segment bit map 143 associated with the segment update's segment identifier will be set. As described above, when each segment update is stored on a tape cartridge currently being used for logging, the bit of the segment bit map 142(*m*) that is associated with the tape cartridge currently used for logging will also be set, thereby indicating that tape cartridge contains the most recently received segment update for the segment, but it will be appreciated that, as described above, tape cartridges used for logging may be changed during a space reclamation operation, and the auxiliary segment bit map 143 will essentially provide a composite of identifiers for the segment updates that are received from the filter/buffer module 51 and stored on the tape cartridge(s) that are used for logging during the space reclamation operation.

The auxiliary segment bit map 143 is used twice during a space reclamation operation, as follows. It will be appreciated that a segment update received for a segment identifier from the filter/buffer module 51 will be a more recent update than the segment update for the same segment identifier that may be stored on the space reclamation source cartridge 136(s). Accordingly, when each segment update which has previously been identified as a candidate for retrieval (as described above) is actually retrieved from the space reclamation source cartridge 136(s), prior to establishing an input queue element 132(i) therefore the particular bit of the auxiliary segment bit map 143 associated with the segment update's segment identifier is tested to determine whether it is set, indicating that a segment update for that identifier received from the filter/buffer module 51 has been stored on a tape cartridge during the space reclamation operation. This may occur if, for example, a segment update received from the filter/buffer module 51 was stored on a tape cartridge 136(m) (m≠s) selected for logging after the segment updates identified as candidates for retrieval have been determined. If, for a candidate segment update retrieved by from the space reclamation source cartridge 136(s), the associated bit of the auxiliary segment bit map 143 is set, the candidate segment update can be discarded without an input queue element 132(i) being established therefore.

On the other hand, if for a candidate segment update retrieved by from the space reclamation source cartridge 136(s), the associated bit of the auxiliary segment bit map 143 is clear, indicating that no segment update for that identifier received from the filter/buffer module 51 has been stored on a tape cartridge during the space reclamation operation, an input queue element 132(i) will be established therefore.

The auxiliary segment bit map 143 is also used during a space reclamation operation as follows. As indicated above, if, for a candidate segment update retrieved by from the space reclamation source cartridge 136(s), the associated bit of the auxiliary segment bit map 143 is clear, indicating that no segment update for that identifier received from the filter/buffer module 51 has been stored on a tape cartridge during the space reclamation operation, an input queue element 132(i) will be established therefore. However, it is possible that a segment update provided by the filter/buffer module 51 be present in the input queue 132 awaiting storage on a tape cartridge 136(m)(m≠s) when the determination is made as to whether to establish an input queue element 132(i) for a segment update retrieved from the space reclamation source cartridge. In that case, the input queue element 132(f) containing the segment update received from the filter/buffer module 51 will be ahead of the input queue element 132(s) containing the segment update retrieved from the space reclamation source cartridge 136(s) in the input queue 132 (that is, index "f" is less than index "s"), and the segment update retrieved from the space reclamation source cartridge 136(s) will be stored after the segment update received from the filter/buffer module 51.

However, it will be appreciated that the earlier-stored segment update (that is, the segment update received from the filter/buffer module 51) will be more recent than the later-stored segment update retrieved from the space reclamation cartridge. Accordingly, to ensure that the earlier-stored segment update (that is, the segment update received from the filter/buffer module 51) will not be deemed invalid over the later-stored segment update retrieved from the space reclamation source cartridge 136(s), the invalid bit 162 is set in the entry 160(e) of the cartridge segment directory 141(m) that is associated with the later stored segment update retrieved from the space reclamation source cartridge 136(s). Thus, when the entry 160(e) is established in the cartridge segment directory 141(m) for each segment update that is retrieved from the space reclamation source cartridge 136(s), the bit of the auxiliary segment bit map 143 associated with the segment update's segment identifier is checked, and if it is set the invalid bit 162 of the entry 160(e) is set. Accordingly, when the cartridge 136(m) is later used as a space reclamation source cartridge 136(s'), the entry 160(e) will be deemed associated with an invalid segment update, and will be ignored when candidate segment updates are selected as described above.

In one particular embodiment, the bits of the segment bit map 142(l) associated with the current logging cartridge 136(l) can be set as the valid segment updates are stored on the cartridge 136(l), but the segment bit maps 142(m)(m≠l) associated with the other cartridges 136(m≠l) will be conditioned when the current logging cartridge is full and unloaded from the drive and a new current logging cartridge selected. In that case, the auxiliary segment bit map 143 will be initialized by copying the contents of the segment bit map 142(l) associated with the current logging cartridge 136(l) at the beginning of the space reclamation operation. Thus, at the beginning of a space reclamation operation, the auxiliary segment bit map 143 will identify all of the segments for which valid segment updates were stored on the cartridge which comprises the current logging cartridge 136(l) at the beginning of the space reclamation operation. As the space reclamation operation proceeds, the bits of the auxiliary segment bit map 143 will also identify all of the segments which are stored on the cartridge or cartridges (if multiple cartridges are used as logging cartridges during the space reclamation operation) which comprise current logging cartridges during the space reclamation operation. Initializing the auxiliary segment bit map 143 in this manner insures that segment updates were stored on the current logging cartridge 136(l) prior to the beginning of the space reclamation operation, which would not have been reflected in the space reclamation source cartridge's segment bit map 142(s), will be reflected in the auxiliary segment bit map 143.

The detailed operations performed by the tape log control module 135 in connection with a storage operation and a space reclamation operation will be described in connection with the flow charts depicted in FIGS. 10 and 11. Generally, operations initiated by the tape log control module 135 will be controlled by (i) the number of empty tape cartridges falling below a predetermined threshold number, which will cause a space reclamation operation to be initiated; and.

(ii) the input queue 132 having a head input queue element 132(l) whose records are to be stored on the respective tape log set 130.

The operations performed by the tape log control module 135 for each of these will be described in connection with FIGS. 10 and 11, respectively.

Figure 10A:
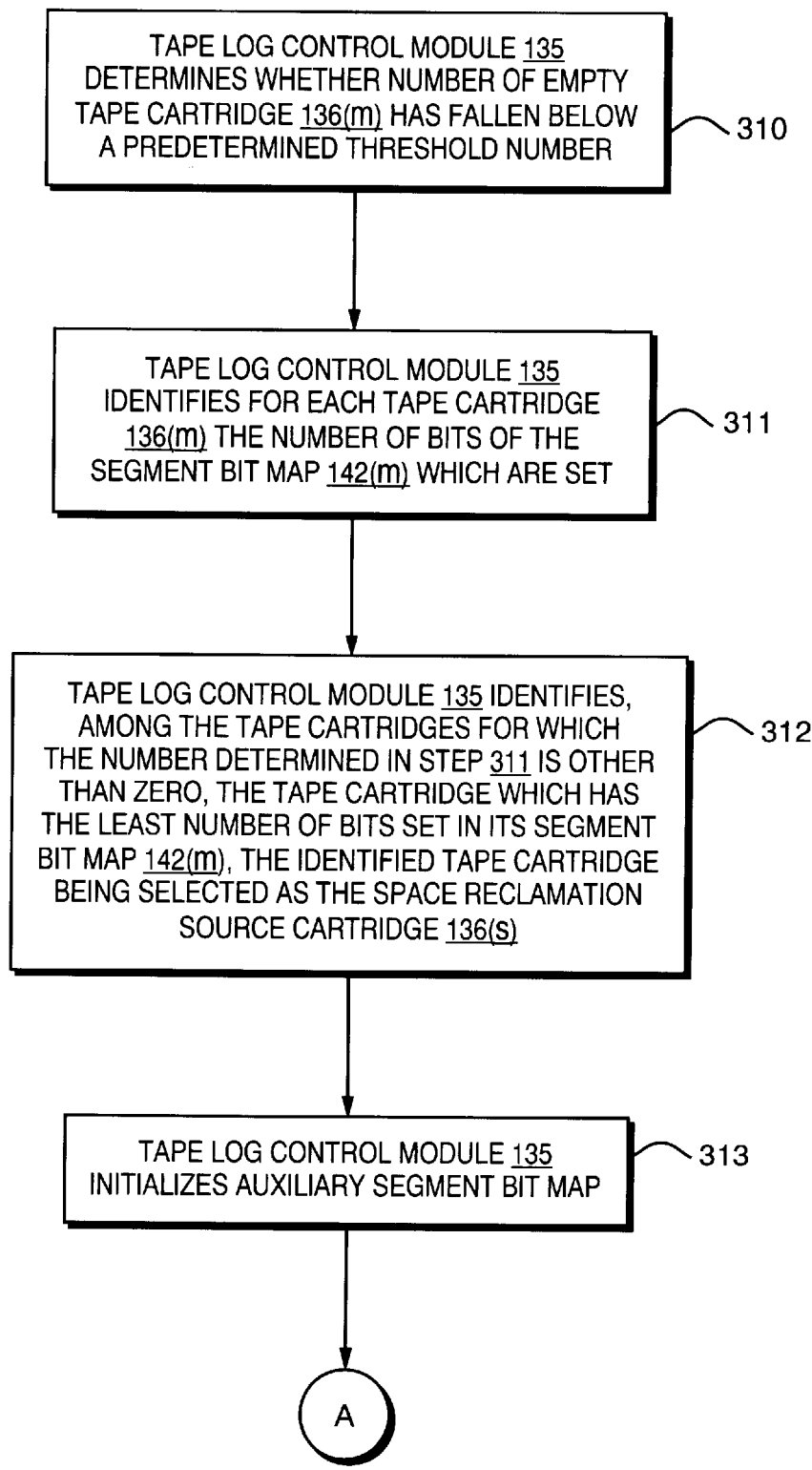
FIGS. 10, 10A, and 10B and 11, 11A, 11B, 11C, and 11D arc flow charts detailing operations performed by the tape log module's tape log control module in controlling the tape log module depicted in FIG.6.
Figure 10B:
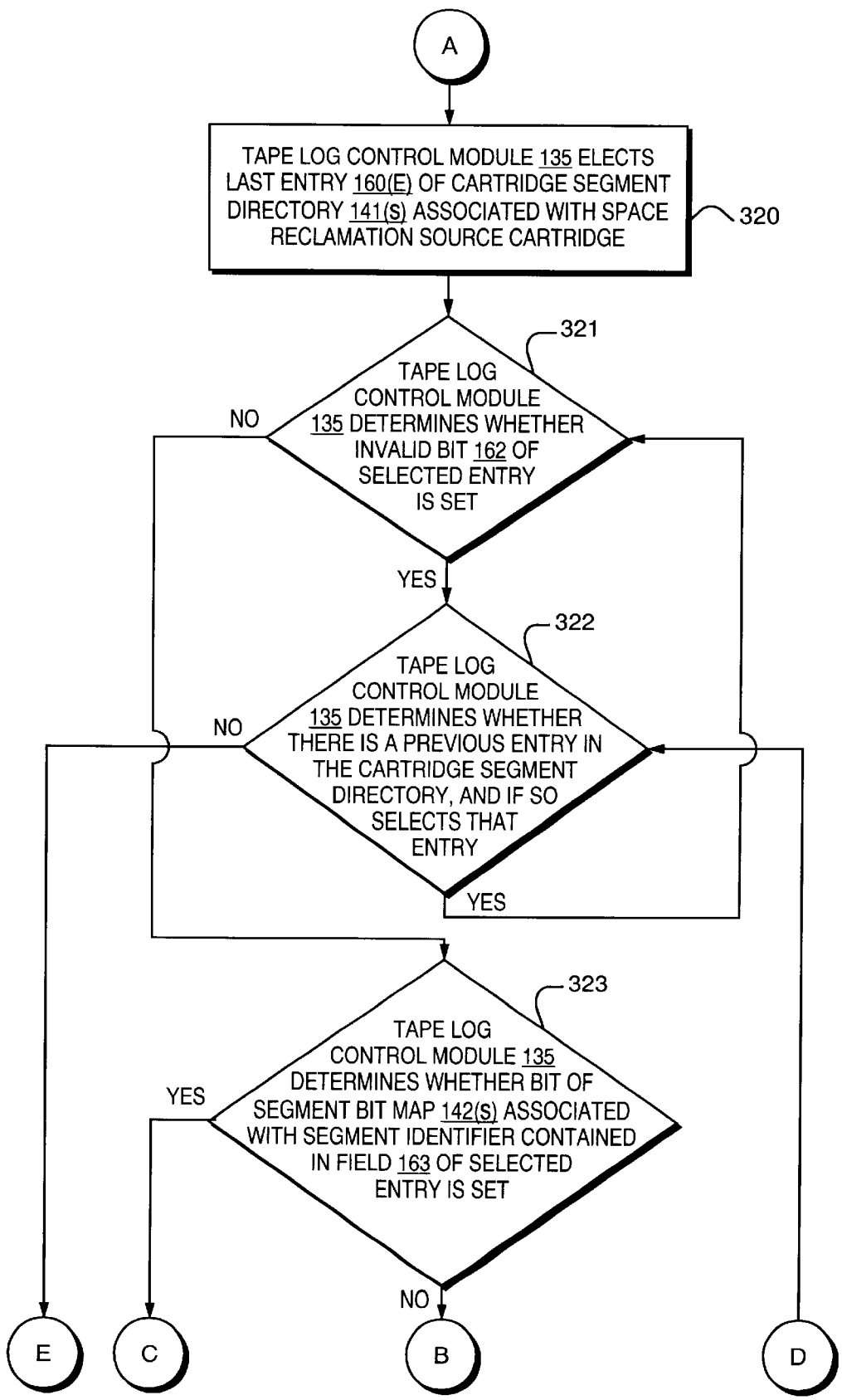
Figure 10C:
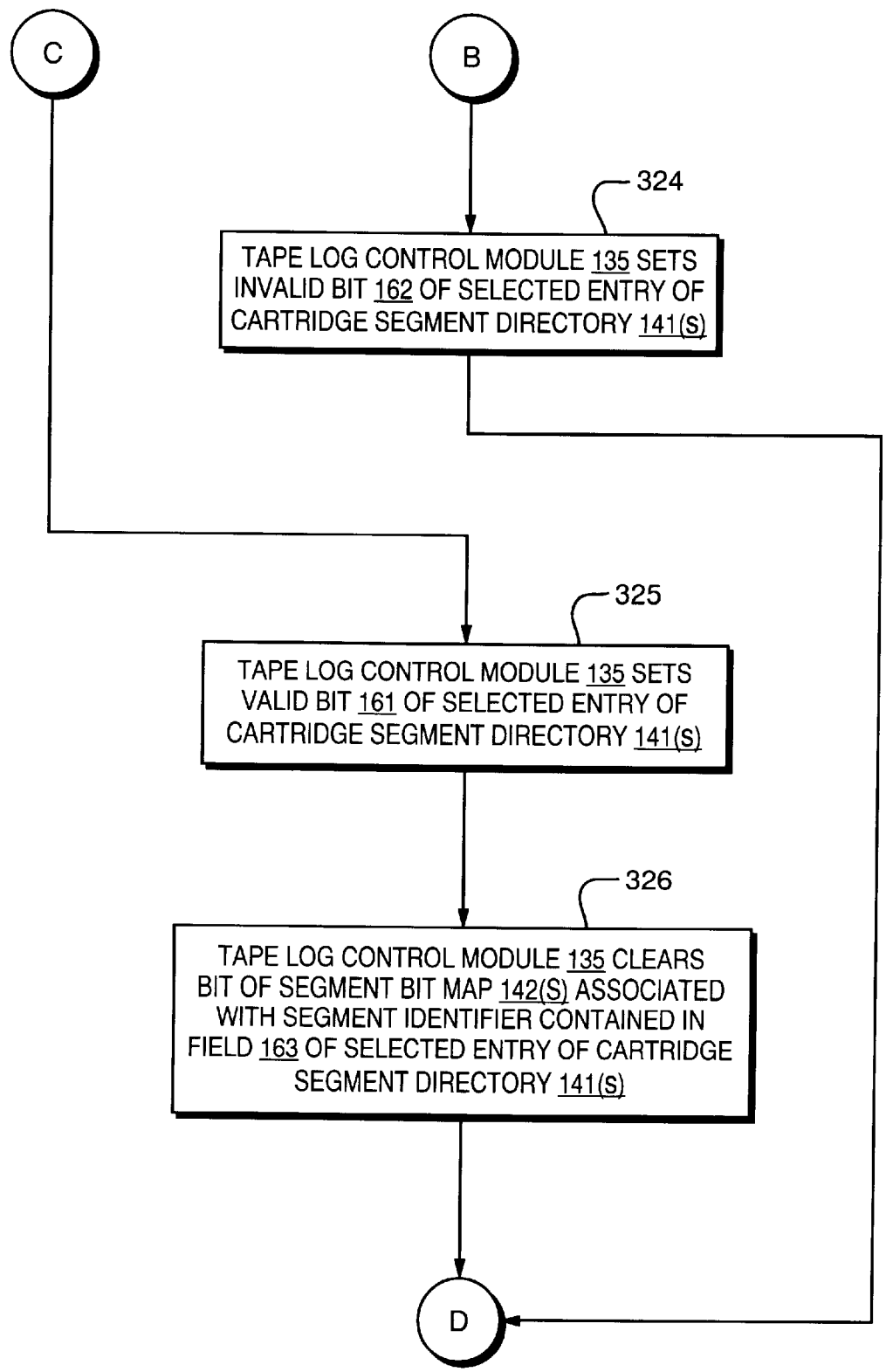
Figure 11A:
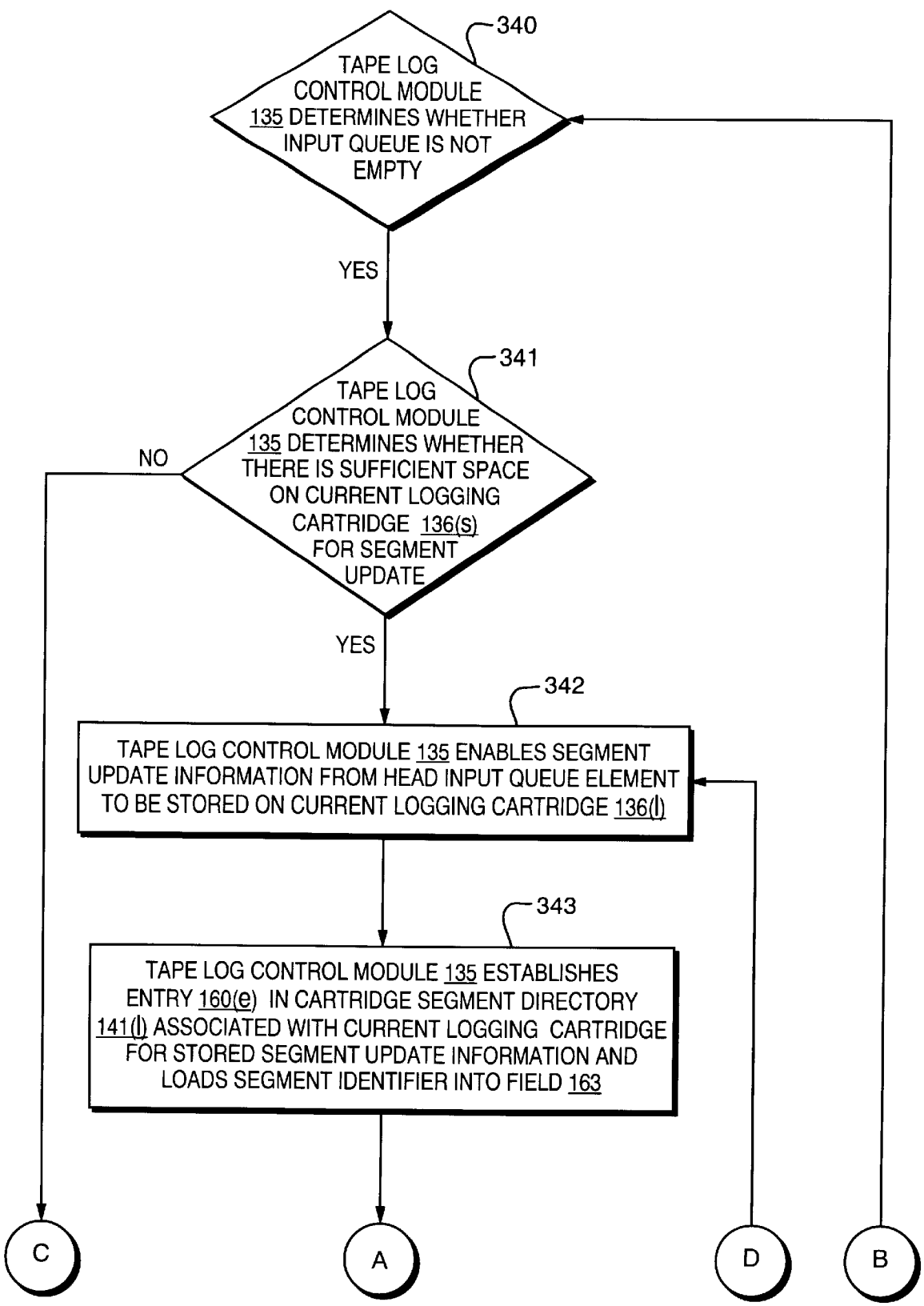
Figure 11B:
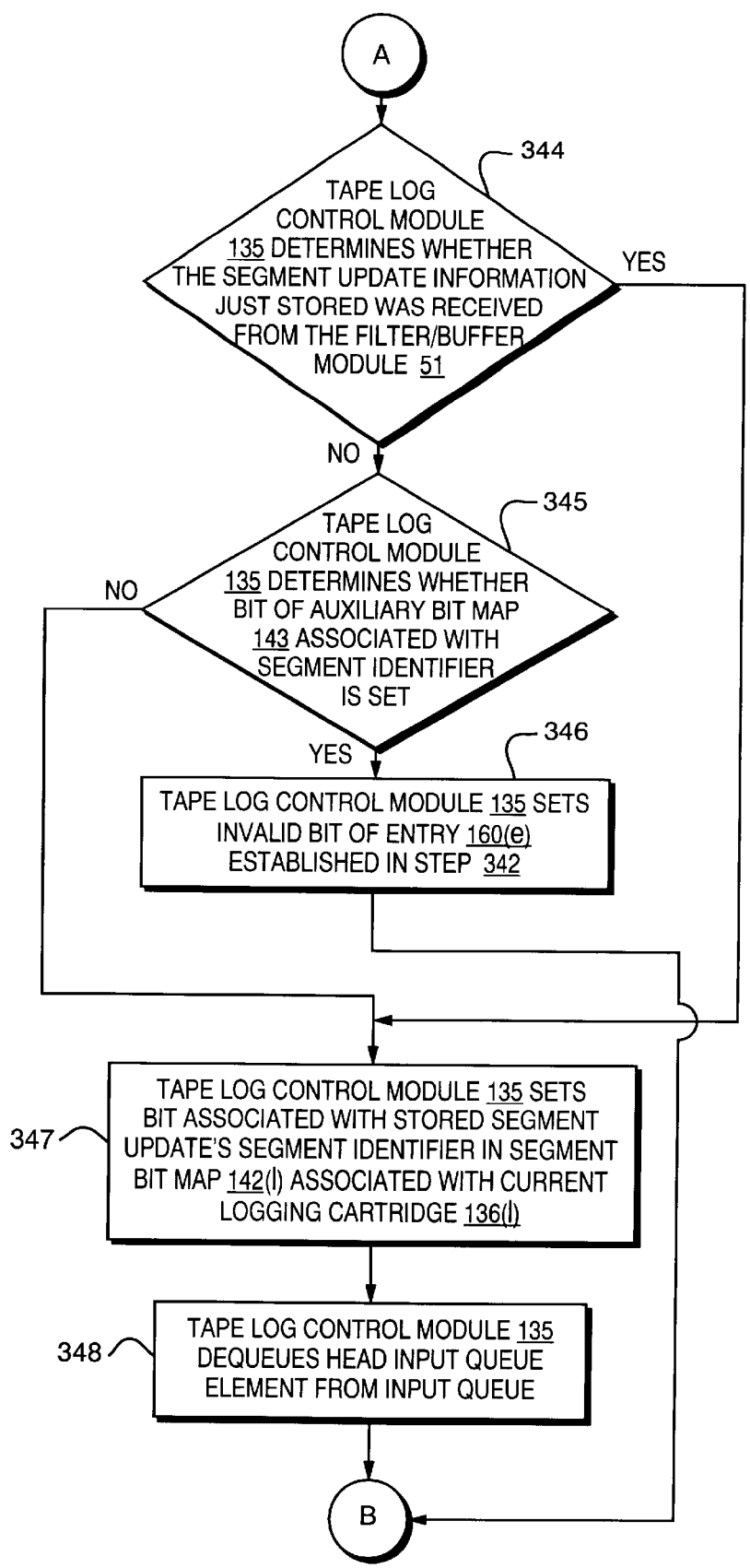
Figure 11C:
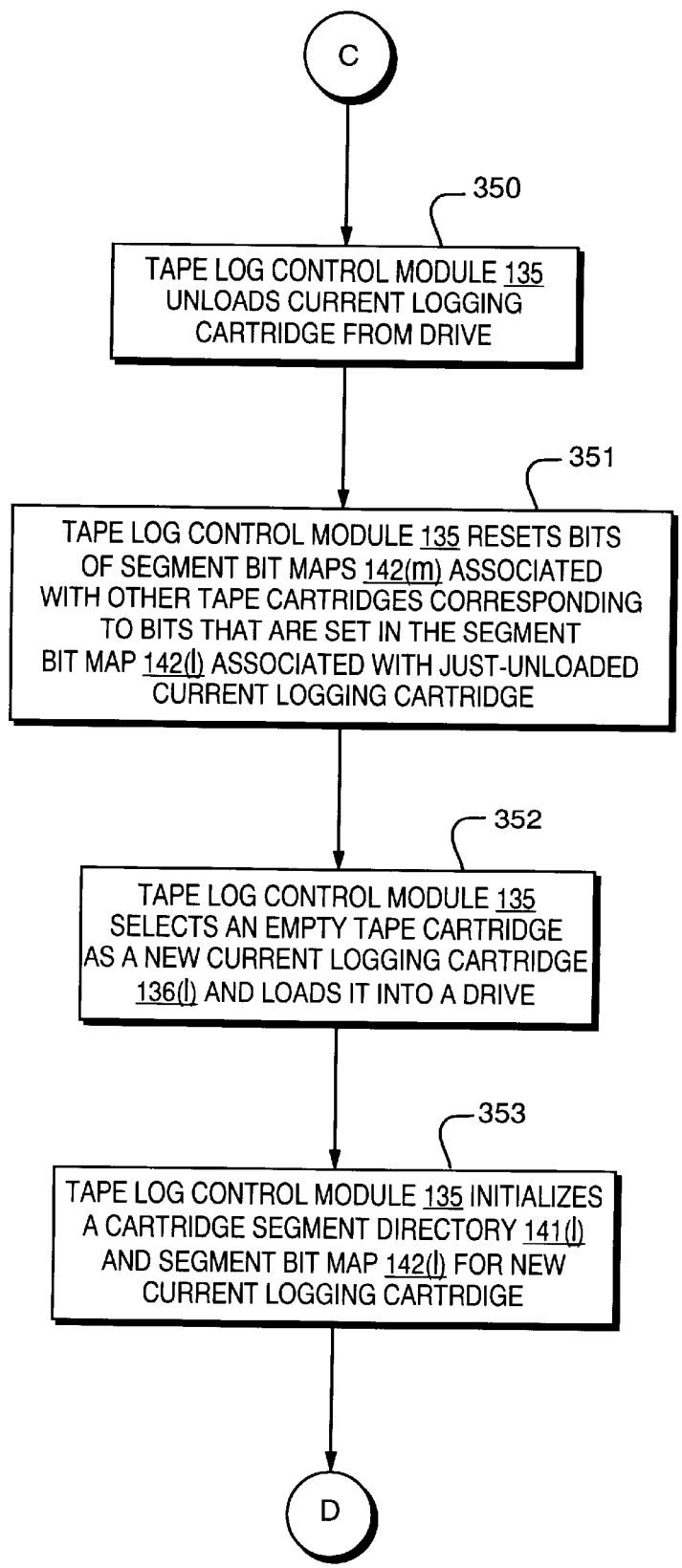
Figure 11D:
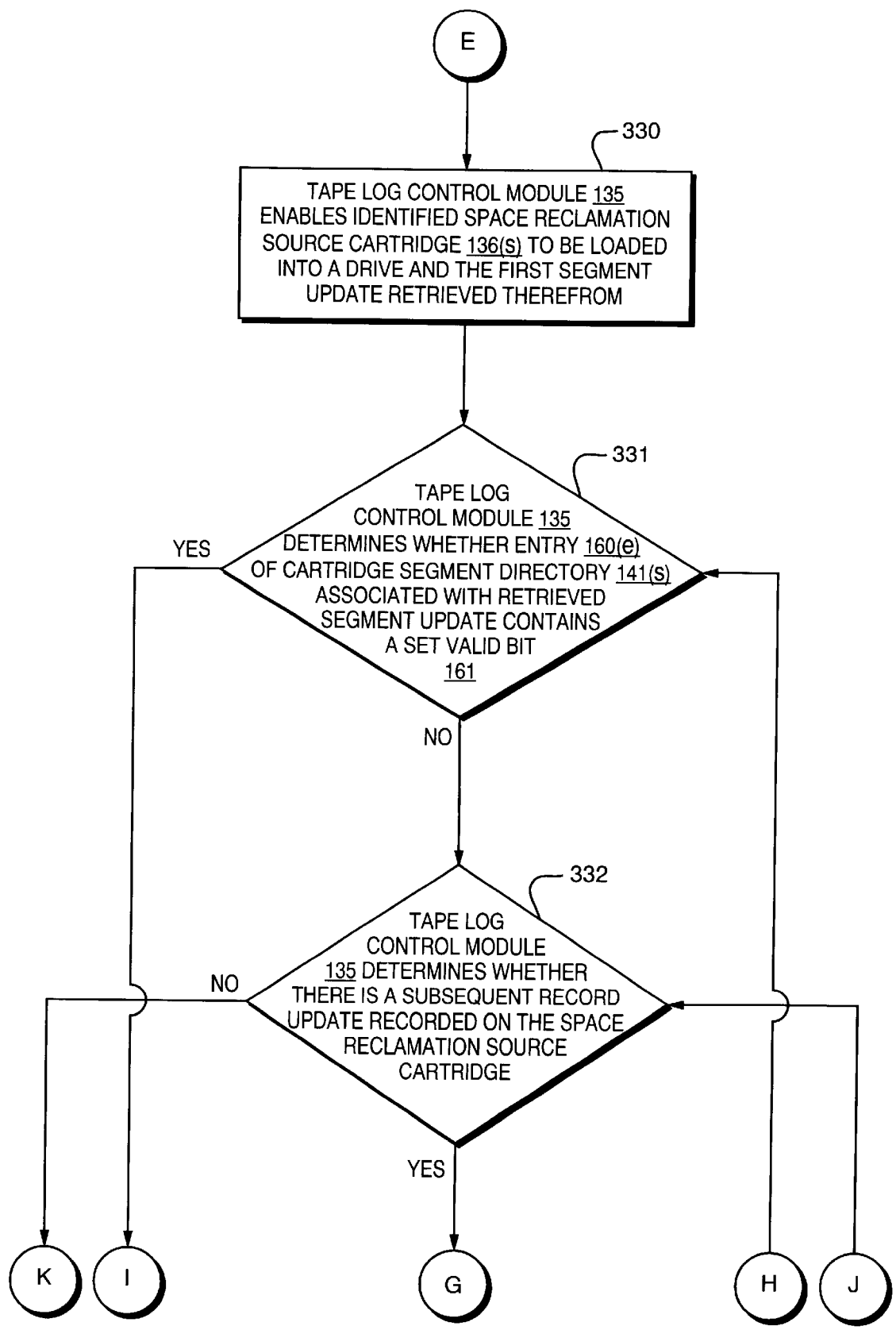
Figure 11E:
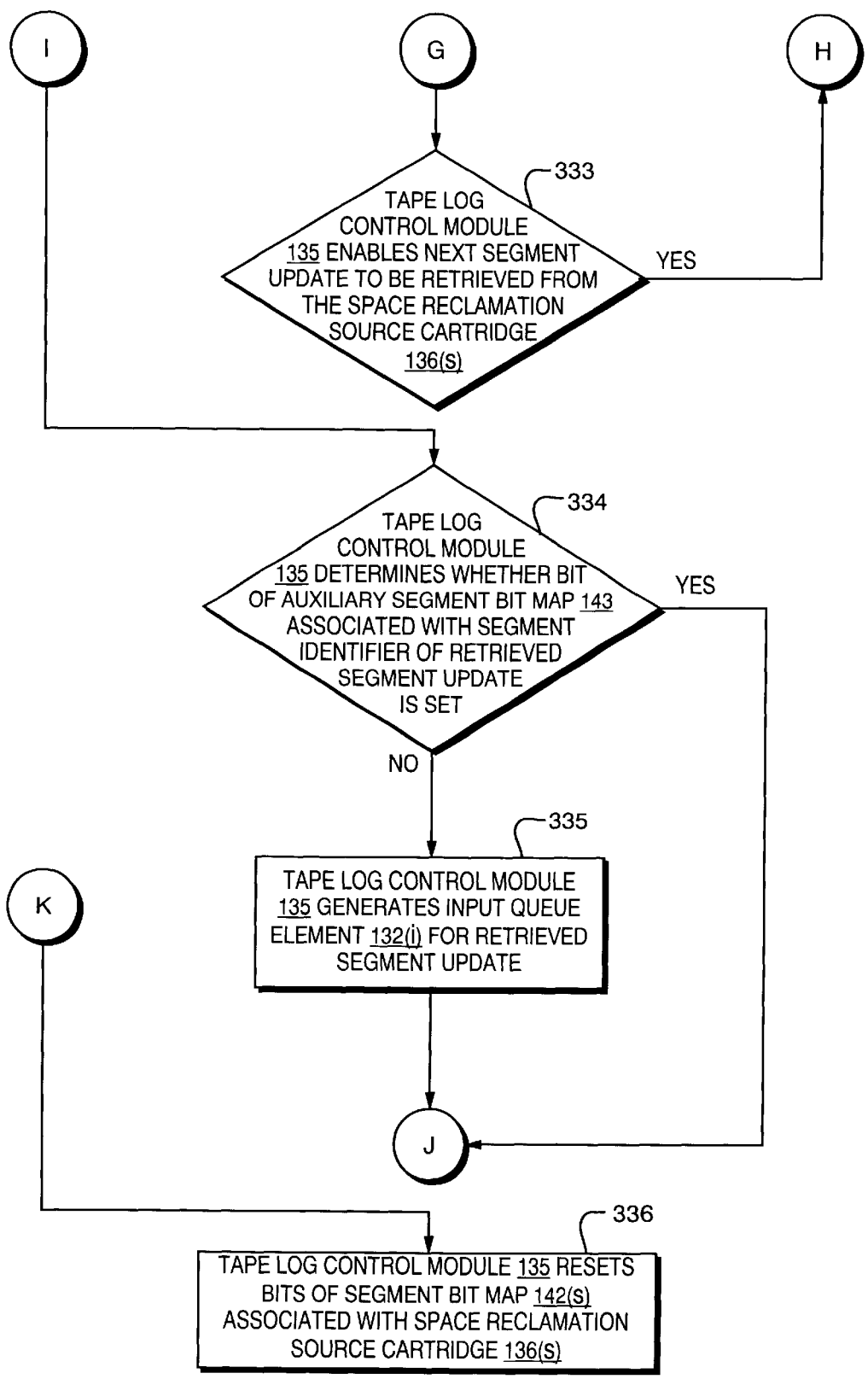
Figure 12A:
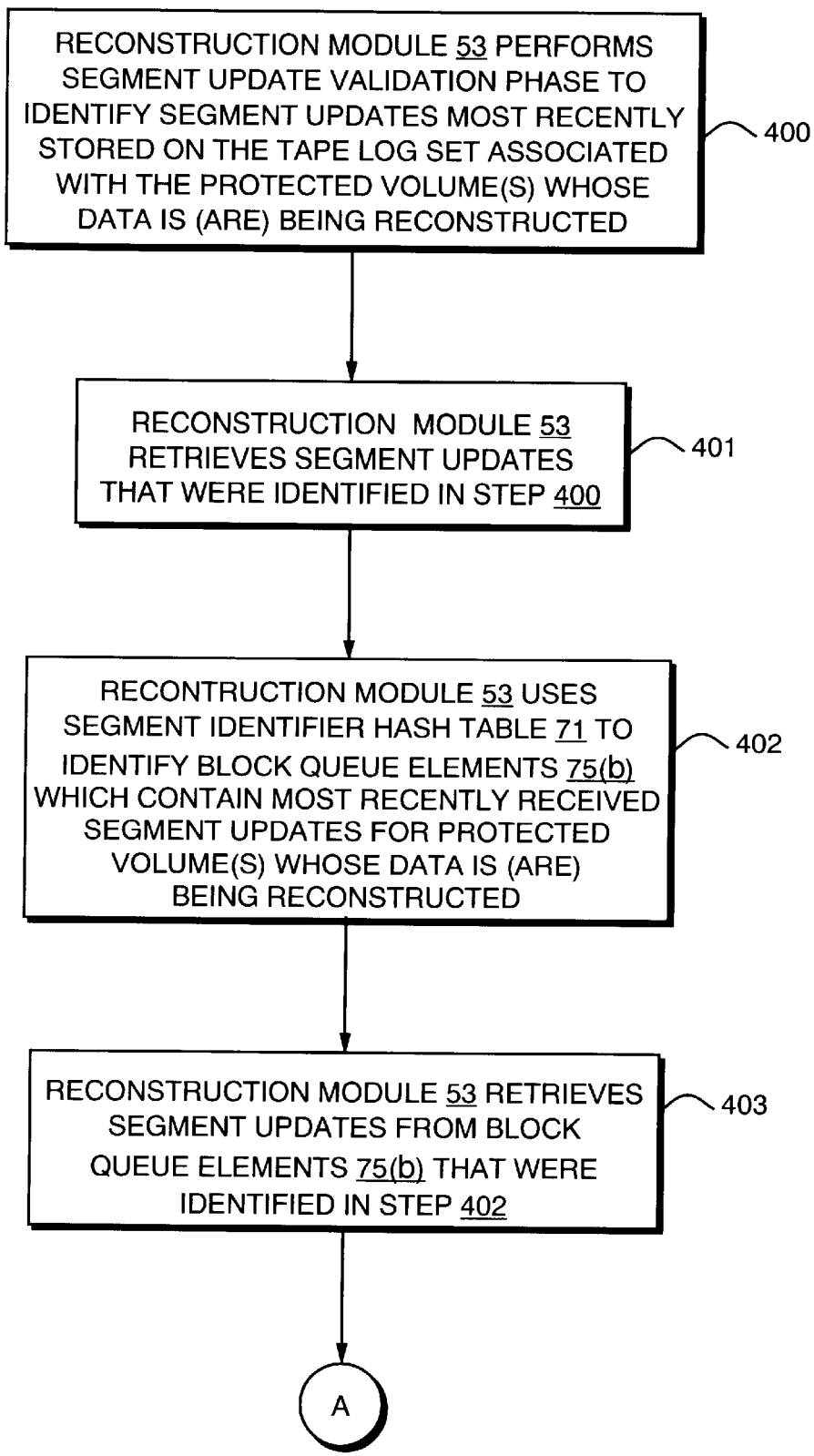
FIGS. 12 and 12A are flow charts detailing operations performed by the reconstruction module 53 depicted in FIG. 1.
Figure 12B:
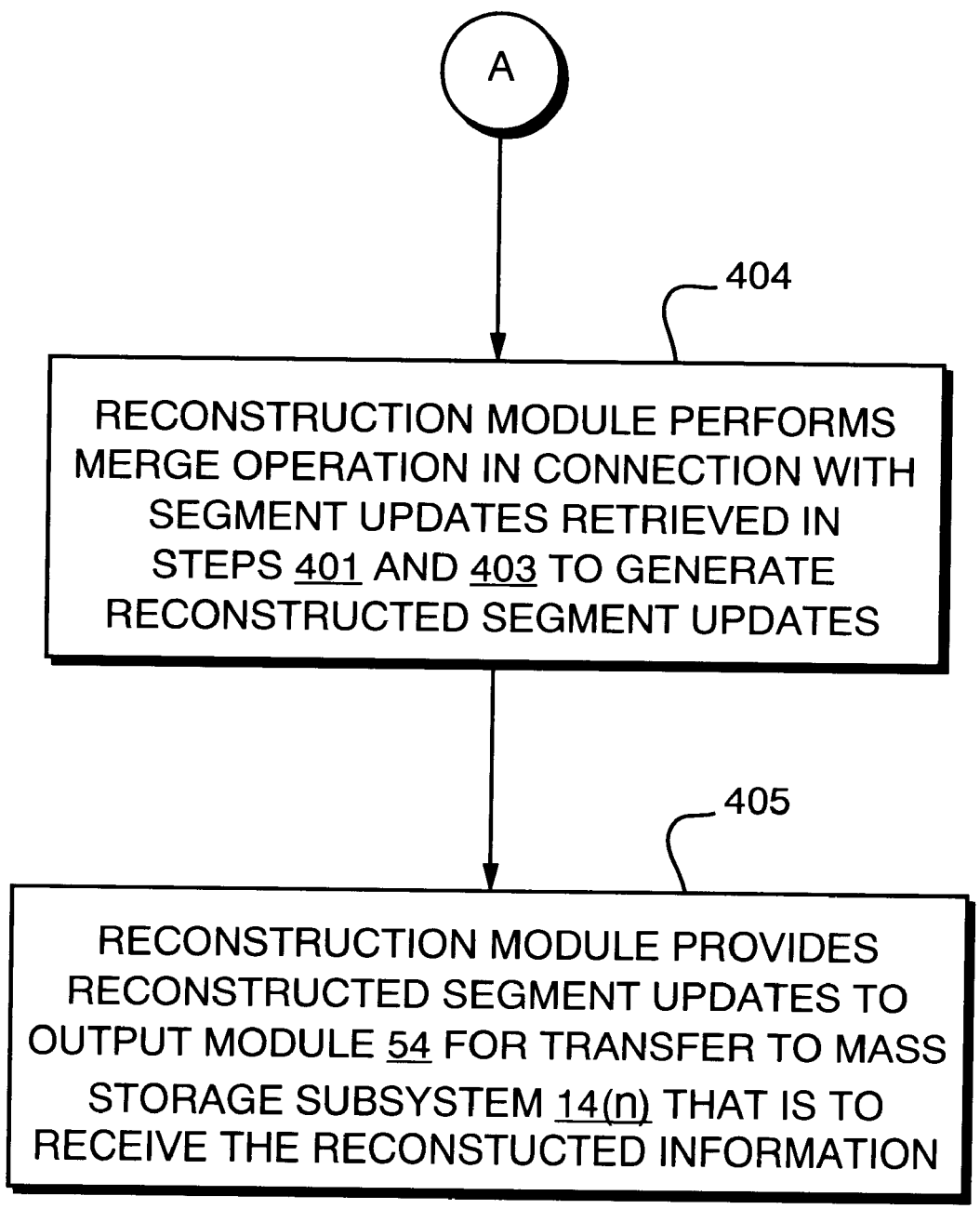

FIG. 10 depicts operations performed by the tape log control module 135 when the number of empty tape cartridges falling below a predetermined threshold number. As indicated above, when the number of empty tape cartridges falls below the predetermined threshold number, a space reclamation operation will be initiated to identify one of the tape cartridges 136(m) to be used as a space reclamation source cartridge 136(s), identify ones of the segment updates recorded on the space reclamation source cartridge 136(s) as valid candidates to be copied to the tape cartridge 136(l) currently being used for logging, and retrieve the identified valid candidate segment updates and selectively generate input queue elements 132(i) therefore and link the generated input queue elements to the input queue. As described above, the determination as to whether an input queue element 132(i) will be generated for a candidate segment update which has been identified as valid is based on the condition of the bit of the auxiliary segment map associated with the candidate segment update's segment identifier, which if set indicates that a segment update received from the filter/buffer module 51 has been stored on a tape cartridge 136(m) since the reconstruction operation has been initiated.

With reference to FIG. 10, during a reclamation operation the tape log control module 135 will initially perform a number of steps to identify one of the tape cartridges 136(m) to be used as a space reclamation source cartridge 136(s), including:

(i) determine whether the number of empty tape cartridges 136(m) has fallen below a predetermined threshold value (step 310);

(ii) in response to a positive determination in step 310, identify for each tape cartridge 136(m) the number of bits of the segment bit map 142(m) which are set (step 311);

(iii) identify, among tape cartridges for which the number determined in step 311 is other than zero, the tape cartridge 136(m) which has the least number of set bits of the segment bit map as determined in step 311 (step 312), and (iv) initialize an auxiliary segment bit map 143 (step 313). Since the segment bit map 142(m) associated with a tape cartridge 136(m) identifies each segment for which a valid segment update is recorded on the tape cartridge 136(m), the tape cartridge 136(m) associated with the segment bit map 142(m) which has the least number of bits set also has the least number of valid segment updates recorded on any of the tape cartridges in the tape log set. Thus, the tape cartridge identified in step 312 will contain the least number of valid segment updates, and is selected as the space reclamation source cartridge.

Following step 313, the tape log control module 135 performs a number of steps to identify ones of the segment updates recorded on the space reclamation source cartridge 136(s) as valid candidates to be copied to the tape cartridge 136(l) currently being used for logging. As described above, the cartridge segment directory 141(s) and segment bit map 142(s) associated with the space reclamation source cartridge 136(s) are used to identify the segment updates which are to be candidates for copying, with the segment directory 141(s) being scanned in reverse order and the valid and invalid bits 161 and 162 being selectively conditioned. At the end of these steps, the segment updates associated with entries 160(e) for which the valid bits 161 are set comprise the valid candidates for copying. More specifically, during those operations the tape log control module 135 will:

(i) select the last entry 160(E) of the cartridge segment directory 141(s) associated with the space reclamation source cartridge 136(s)(step 320);

(ii) determine whether the invalid bit 162 of the selected entry is set (step 321)

(iii) in response to a positive determination in step 321, determine whether there is a previous entry in the cartridge segment directory 141(s)(step 322), and, if it makes a positive determination return to step 321 to process the previous entry.

(iv) Returning to step 321, if the tape log control module 135 determines that the invalid flag of the selected entry is not set, it tests the bit of the segment bit map 142(m) associated with the segment identifier contained in field 163 of the selected entry to determine whether that bit is set (step 323;

(v) in response to a negative determination in step 323, the tape log control module 135 sets the invalid bit 162 of the selected entry of the cartridge record directory 141(m)(step 324); but (vi) in response to a positive determination in step 323, the tape log control module 135 sets the valid bit 161 of the selected entry of the cartridge record directory 141(m)(step 325), and (vii) clears the bit of the bit of the segment bit map 142(m) associated with the segment identifier contained in field 163 of the selected entry (step 326).

Thus, steps 321 and 322 will ensure that, if the invalid bit associated with an entry 160(e) is set prior to beginning the operations described above in connection with steps 320 through 326, the valid bit for the entry, which identifies the valid candidates for copying, will not be set. On the other hand, if the invalid bit is not set prior to beginning the operations described above in connection with steps 320 through 326, the valid bit will be set only if the bit of the space reclamation source cartridge's segment bit map 142(s) that is associated with the segment update's segment identifier is set. Step 326 will ensure that this occurs for only one such entry 160(e), namely, the last entry in the cartridge segment directory 141(m) which contains the segment identifier for which the invalid flag is not set. Following either step 324 or step 326, the tape log control module 135 returns to step 322 to determine whether there is a previous entry in the cartridge segment directory 141(s) associated with the space reclamation source cartridge 136(s) and, if so, returns to step 321 to begin processing that entry.

The tape log control module 135 performs the operations described above in connection with steps 320 through 326 through one or more iterations until it determines in step 322 that there are no more entries in the cartridge segment directory 141(s) associated with the space reclamation source cartridge. At that point, the tape log control module 135 proceeds to a series of steps to retrieve the valid candidate segment updates which have been identified and selectively generate input queue elements 132(i) therefore and link the generated input queue elements to the input queue. In those operations, the tape log control module 135 will:

(i) enable the identified space reclamation source cartridge 136(s) to be loaded into a drive and the first segment update retrieved therefrom (step 330);

(ii) determine whether the entry 160(e) of the cartridge segment directory 141(s) associated with the retrieved segment update contains a valid bit 161 that is set (step 331);

(iii) in response to a negative determination in step 331, determine whether there is a subsequent segment update recorded on the space reclamation source cartridge 136(s)(step 332)

(iv) in response to a positive determination in step 332, enable the next segment update to be retrieved from the space reclamation source cartridge 136(s)(step 333) and return to step 331 to initiate processing for that segment update.

(v) In response to a positive determination in step 331, test the bit of the auxiliary segment bit map 143 associated with the segment identifier which is associated with the retrieved segment update to determine whether it is set (step 334).

If there is a positive determination in step 334, the tape log control module 135 returns to step 332, which will cause the most recently retrieved segment update to be ignored. As described above, if the bit of the auxiliary segment bit map 143 is set, a segment update having the same segment identifier and received from the filter/buffer module 51 has been stored on a tape cartridge 136(m) during the space reclamation operation, and so the segment update received from the space reclamation source cartridge will be ignored. Accordingly, if there is a positive determination in step 334, the tape log control module 135 returns to step 332 to determine whether there is a subsequent segment update recorded on the space reclamation source cartridge 136(s) and, if so, initiate processing of that segment update.

Returning to step 334, if the tape log control module 135 makes a negative determination in that step, no segment update having the same segment identifier and received from the filter/buffer module 51 has been stored on a tape cartridge 136(m) during the space reclamation operation. In that case, the tape log control module 135 generates an input queue element 132(i) for the segment update and links it to the input queue 132, in a manner similar to that described above in connection with generation of an input queue element 132(i) for segment update information received from the filter buffer module (FIG. 9A)(step 335), except that the input queue element 132(i) generated in step 335 indicates that the information contained therein originated from the space reclamation source module. Thereafter, the tape log control module 135 returns to step 332 to determine whether there is a subsequent segment update recorded on the space reclamation source cartridge and, if so, initiate processing of that segment update.

Returning to step 332, if the tape log control module 135 determines in that step that the space reclamation source cartridge 136(s) contains no further segment updates to be processed, all of the possible segment updates which are candidates for copying from the space reclamation source cartridge 136(s) onto the current logging cartridge 136(l) have been retrieved from the space reclamation source cartridge, and so all of the bits of the segment bit map 142(s) associated with the space reclamation source cartridge 136 (s) can be reset (step 336), indicating that it is empty.

FIG. 11 depicts operations performed by the tape log control module 135 when the input queue 132 has a head input queue element 132(l) whose segment update information is to be stored on the respective tape log set 130. It will be appreciated that the input queue 132 will have a head input queue element if it contains at least one input queue element. With reference to FIG. 11, during those operations the tape log control module 135:

(i) determines whether the input queue 132 has a head input queue element 132(l)(step 340);

(ii) in response to a positive determination in step 340, determines whether the current logging cartridge 136(l) contains enough space to store the segment update information contained in the head input queue element 132(l)(step 341);

(iii) in response to a positive determination in step 341, enables the segment update information from the head input queue element 132(l) to be stored on the current logging cartridge 136(l)(step 342);

(iv) establishes an entry 160(e) in the cartridge segment directory 141(l) associated with the current logging cartridge for the stored segment update information, in the process storing the segment update's segment identifier in field 163 of the new entry 160(e)(step 343); and (v) determines whether the segment update information contained in the head input queue element 132(l) was received from the filter/buffer module 51 (step 344).

(vi) If the tape log control module 135 makes a negative determination in step 344, the segment update information from the head input queue element 132(l) recorded on the current logging tape cartridge 136(l) had been received from the space reclamation source cartridge during a space reclamation operation, and so the tape log control module 135 will test the auxiliary segment bit map 143 to determine whether the bit associated with the segment update's segment identifier is set (step 345), and (vii) in response to a positive determination in step 344, set the invalid bit of the entry 160(e) established in step 342 (step 346).

On the other hand, if the tape log control module 135 makes a negative determination in step 345 (which will occur if the bit in the auxiliary segment bit map 143 associated with the segment update's segment identifier is not set), or if it makes a positive determination in step 344 (which will occur if the segment originated from the filter/buffer module 51), the tape log control module 135 will set the bit associated with the segment update's segment identifier in the segment bit map 142(l) associated with the current logging tape cartridge 136(l)(step 347), thereby to indicate that the current logging tape cartridge 136(l) contains the most recently received segment update for the segment. Thereafter, the tape log control module can dequeue the head input queue element 132(l) from the input queue 132 and enqueue it to the tape log module's queue element source for use later in establishing input queue elements (step 348), thereby to establish the next input queue element as the head input queue element.

Returning to step 341, if the tape log control module 135 makes a negative determination in that step, that is, if it determines that the current logging tape cartridge 136(l) does not have enough space for the information to be stored in the head input queue element 132(l), it will proceed to a series of steps to unload the current logging cartridge from the drive, replace it with a new current logging cartridge, and update various data structures. In particular, the tape log control module 135 will:

(i) unload the current logging cartridge 136(l) from the drive (step 350);

(ii) reset the various bits of the segment bit maps 142(m) (m≠l) which are associated with the other tape cartridges 136(m)(m≠l) which correspond to the bits that are set in the segment bit map 142(l) which is associated with the cartridge that was unloaded in step 350 (step 351);

(iii) select an empty tape cartridge 136(m) from the tape logging set 130 and load it into the drive as the new current logging cartridge 136(l')(step 352); and (iv) initialize the cartridge segment directory 141(l') and segment bit map 142(1') for the new current logging cartridge (step 353).

Thereafter, the tape log control module 135 returns to step 342 to perform the operations described above to store the information from the head input queue element 132(*l*) on the new current logging cartridge 136(*l*'). It will be appreciated that the tape log control module 135 will enable the operations described above in connection with steps 340 through 348 and 350 through 353 as long as the input queue 132 is not empty, in connection with successive head input queue elements.

E. Reconstruction Module 53

The reconstruction module 53 performs a reconstruction operation to fully or partially reconstruct the information stored on a single storage device 22 (FIG. 2), multiple storage devices or an entire mass storage subsystem 14(*n*) (FIG. 1). A full reconstruction may be necessitated by, for example, a catastrophic failure in connection with the protected volume, in which case the remote data protection facility 5 may supply the reconstructed information to, for example, the original digital data processing system 10(*n*) or another digital data processing system 10(*n*')(n'≠n) if the original digital data processing system 10(*n*) is unavailable. On the other hand, a partial reconstruction may be necessitated by, for example, a failure of one or a limited number of storage devices 22 (FIG. 2) on the original digital data processing system 10(*n*), and the reconstructed information may be reconstructed to other storage devices on the same digital data processing system 10(*n*).

In performing a reconstruction operation, the reconstruction module 53 will retrieve the most recently-stored segment updates for the protected volume(s) whose data is (are) being reconstructed from the tape cartridges 136(*m*) of the tape log set 130 that is associated with the protected volume (s), in the process using the cartridge segment directories 141(*m*) and segment bit maps 142(*m*) that are associated with those cartridges 136(*m*) to identify those segment updates. In addition, the reconstruction module will use the block queue 70 and segment identifier hash table 71 of the filter/buffer module 51 to identify the most recently-received segment updates which have not been stored on the tape log set 130. A reconstruction operation effectively proceeds in several phases, as generally illustrated in the flow chart in FIG. 12, including (i) a segment update validation phase (step 400), in which entries 160(*e*) of the cartridge record directories 141(*m*) are validated to identify the most recently-stored valid ones of the segment updates for the protected volume (s) whose data is (are) being reconstructed that is recorded on the tape log set, (ii) retrieving the segment updates which have been validated from the cartridges of the tape log set (step 401), (iii) using the segment identifier hash table 71 to identify ones of the block queue elements 75(*b*) of the block queue whose blocks 77 contain the most recently-received segment updates for the protected volume(s) whose data is (are) being reconstructed (step 402), (iv) retrieving the segment updates associated with the protected volume(s) whose data is (are) being reconstructed from the blocks identified in step 402 (step 403), (v) merging the ones of the segment updates retrieved from the block queue 70 in step 403 that comprise partial segment updates, into the full segment updates retrieved from either the tape log set in step 401 or from the block queue 70 in step 403 (step 404), thereby to generate reconstructed segment updates, and (vi) providing the reconstructed segment updates to the output module 54 for transfer to the mass storage subsystem 14(*n*) to receive the reconstructed information (step 405).

Operations performed by the reconstruction module 53 in connection with the segment update validation step (step 401) are generally similar to those performed by the tape log control module 135 in validating segment updates during a space reclamation operation, as described above in connection with FIG. 10, except that the reconstruction module 53 need only validate the segment updates for segments that are associated with the protected volume(s) whose data is being reconstructed.

In addition, in identifying the ones of the block queue elements 75(*b*) whose blocks 77 contain the most recently-received segment updates for the protected volume(s) whose data is (are) being reconstructed (step 402), the reconstruction module 53 can scan through all of the lists 111(*h*) to locate entries whose segment identifier fields 112 correspond to the segment identifiers for the protected volume(s) whose data is (are) being reconstructed.

Although the reconstruction module 53 has been described as merging the segment updates retrieved from the block queue 70 into the segment updates retrieved from the tape log set 130 in step 404, it will be appreciated that the merging operation can alternatively be performed by the mass storage subsystem 14(*n*) which is to receive the reconstructed information.

F. Output Module 54

Figure 7:
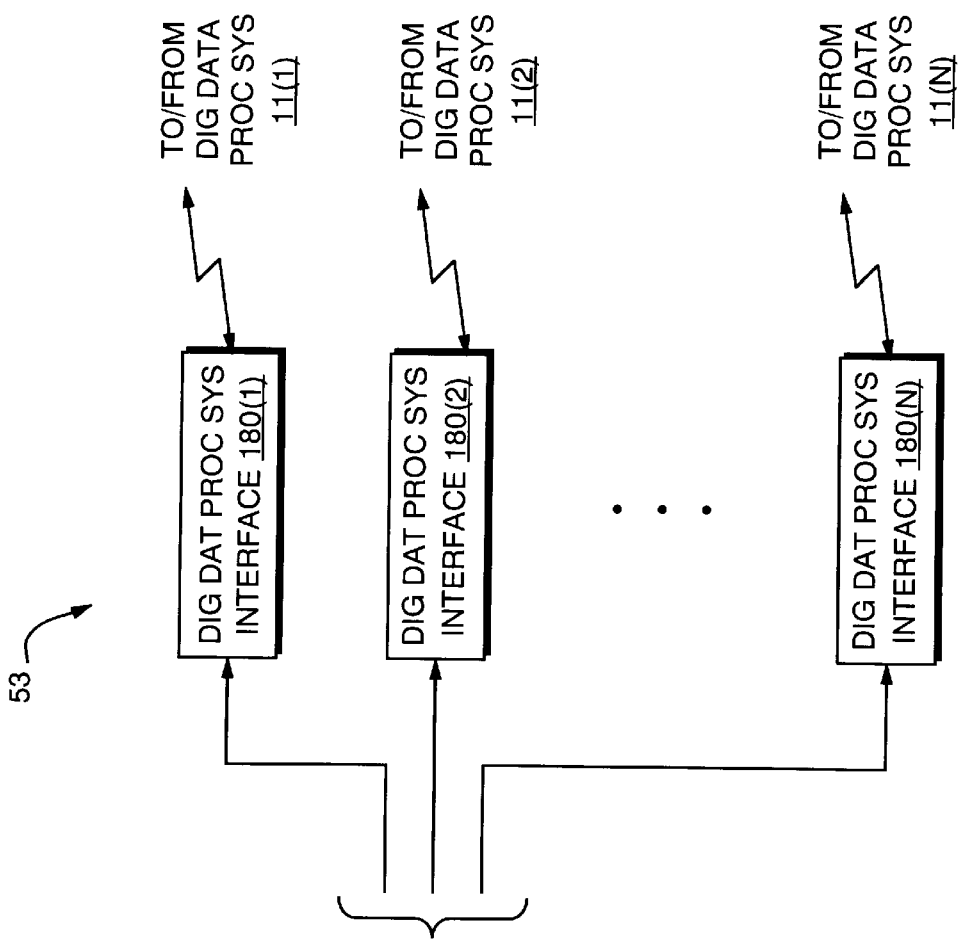
FIG. 7 is a functional block diagram of an output module useful in the remote data protection facility depicted in FIG. 1.

FIG. 7 depicts the structure of the output module 54 useful in the remote data protection facility 5. With reference to FIG. 7, the input module 50 includes a plurality of interfaces 180(*l*) through 180(N)(generally identified by reference numeral 180(*n*)) each of which is connected to transmit information received from the tape log module 52 (FIG. 6) to a correspondingly-indexed digital data processing system 10(*n*) over a communication link 12(*n*). Each interface 180(*n*) receives digital information from the tape log module 52 from a particular tape log set 130 and generates in response thereto signals, either in electrical or optical form, for transmission to the associated digital data processing system 10(*n*).

III. Summary

The remote data protection facility 5 described above provides a number of advantages. The remote data protection facility 5 provides an arrangement which can provide efficient remote mirrored data storage for one or more digital data processing systems 10(*n*), which can protect against loss of digital data for any of a number of reasons. The remote data protection facility 5 and the remote data protection facility interface 17 (FIG. 2) cooperate to enable segment updates to be transferred from the respective mass storage subsystem 14(*n*) to the remote data protection facility 5, and to enable reconstructed segments to be transferred from the remote data protection facility 5 to the respective mass storage subsystem 14(*n*), without requiring assistance of or control by a host computer 11(*n*). Thus, the mirrored data storage is effectively transparent to the host computers 11(*n*) and their operators.

The buffering and filtering performed by the filter/buffer module 51 provides for the efficient storage of segment updates that are received from the digital data processing systems 10(*n*), and serves to reduce the number of segment updates which are logged by the tape log module 52. In many data processing applications, retrievals from and updates to data are relatively localized, that is, the applications may process and update data in the same segment several times within a relatively short period of time. The buffering and filtering performed by the filter/buffer module 51 will assist in ensuring that all of the updates (which will primarily comprise partial segments) will be buffered by the remote data protection facility 5, but that segments (which in one embodiment comprise full segments) will not be provided to the tape log module 52 for logging until some time has passed since the applications began processing data from a segment. Thus, if the application is processing in a localized manner, the segments provided to the tape log module 52 for logging will preferably contain at least some substantial portion of the localized processing for each respective segment for at least some period of time.

In addition, since the filter/buffer module 51 stores the segment updates in a queue, namely, the block queue 70, the ordering of the receipt of segment updates for each segment that are buffered by the filter/buffer module 51 can be readily determined from their relative positions in the queue.

The tape log module 52 also provides a number of advantages. By dividing the cartridges which are provided by the tape log module 52 into a plurality of log sets, and providing that segment updates from each protected volume are logged on one of the tape log sets, instead of any of the tape cartridges, when information stored on a protected value is to be reconstructed, the tape log module 52 effectively reduces the number of cartridges that need to be processed to retrieve the information required for the reconstruction, and thus reduce the time which is necessary for a reconstruction.

Furthermore, the various data structures established and maintained by the tape log module 52, in particular the cartridge segment directories 141(*m*), the segment bit maps 142(*m*) and the auxiliary segment bit map 143, provide an efficient mechanism for rapidly identifying the most recently-logged segment updates stored in the tape log module 52. For each tape cartridge, the segment bit maps 142(*m*) efficiently identify the valid segment updates which are stored on the respective cartridge, but not necessarily which segment updates on the cartridge are valid. The cartridge segment directories 141(*m*), on the other hand, identify the series of segment updates which are recorded on each respective tape cartridge. Since, except for segment updates provided by during a space reclamation operation, the segment updates for each segment are stored on the tape cartridges in the order they are received, the valid segment update for each segment as received from the filter/buffer module 51 can be efficiently determined as the last segment update on the tape cartridge as indicated by the cartridge's cartridge segment directory 141(*m*). During a space reclamation operation, this ordering may not be preserved, and the auxiliary segment bit map 143 is provided to assist in invalidating segment updates for which the ordering is not preserved.

In addition, the reconstruction module 53 provides for the efficient reconstruction of information for the protected volumes using the data structures which are established and maintained by the filter/buffer module 51 and the tape log module 52 for their purposes, and without requiring additional structures to support reconstruction.

It will be appreciated that a number of modifications may be made to the remote data protection facility 5. For example, while the remote data protection facility 5 has been described as providing back-up mirrored storage of digital data from a number of digital data processing systems 10(*n*), it will be appreciated that the remote data protection facility 5 can provide back-up mirrored storage for a single digital data processing system. In addition, the remote data protection facility 5 may provide storage for digital data that may be provided by, and used by, any source or destination of digital data, including, for example, video data in digital form.

Furthermore, although the invention has been described as providing a remote data protection facility 5 and mass storage subsystem 14(*n*) which provides for back-up mirrored storage of digital data without the requirement of a host computer 11(*n*) controlling the transfer of data to the remote data protection facility 5 for back-up mirrored storage, or the receiving reconstructed data from the remote data protection facility 5, it will be appreciated that such data transfers between the mass storage subsystem 14(*n*) and remote data protection facility 5 may proceed under control of one or more host computers 11(*n*) which may be provided in a digital data processing system 10(*n*). In addition, it will be appreciated that, for a particular remote data protection facility 5, data transfers with one or more of the digital data processing systems may be controlled by a host computer, whereas data transfers with one or more other digital data processing systems may proceed independently of control by a host computer.

In addition, although one embodiment of the remote data protection facility 5 has been described as including an autochanger which provides eighty-eight digital linear tape (DLT) cartridges divided into eight log sets, and nine drives, the remote data protection facility 5 may advantageously make use of such storage elements having more or fewer cartridges, log sets and drives. Preferably, at least one more drive will be provided than the number of log sets, so that space reclamation with a cartridge from at least one log set can proceed contemporaneously with data storage for all of the log sets which may be provided in the remote data protection facility. In addition, although a relatively non-random access storage medium such as tape is advantageously used for the logging operations performed by the remote data protection facility 5, storage media other than or in addition to tape may be used.

Further, although in one embodiment the filter/buffer module 51 has been described as buffering information received thereby using one or more disk storage devices, it will be appreciated that other digital data storage devices, such as conventional random access memories, may be used in instead of the disk storage devices or to augment the storage provided by the disk storage devices.

In addition, although in one embodiment the filter/buffer module 51 has been described as providing a hash table 71 for storing pointers to blocks in the block queue which contain valid segment updates, it will be appreciated that other arrangements may be used. For example, a list may be provided having one entry for each possible segment identifier, in which each entry for which a valid segment update is being buffered in the filter/buffer module 51 contains a pointer to the block queue entry 75(*b*) which contains the valid segment update. Depending on the percentage of segments for which segment updates are buffered in the filter/buffer module 51, it will be appreciated that such a list may be sparsely populated, but using such a list instead of a hash table 71 can reduce the time required to identify the particular block queue entry 75(*b*) which contains the valid segment update since no hashing function would need to be computed. If a hash table 71 is used, any convenient hashing function can be selected for use in determining the particular linked list 111(*h*) associated with each segment identifier.

Furthermore, although the filter/buffer module 51 has been described as maintaining the hash table 71 so as to point to the block 77 which contains only the most recently-received segment update for each segment identifier, it will be appreciated that the filter/buffer module 51 may instead maintain the hash table so as to point to multiple segment updates. This can be particularly advantageous in connection with partial segments, and particularly when the partial segments are disjoint (that is, non-overlapping) or partially overlapping, since each partial segment may contain updated information which may not be updated in others of the partial segments for the same segment identifier. Although in one embodiment the partial segments are not transferred to the tape log module 52 for storage, if the most recent segment update(s) received for a particular segment is a (are) partial segment(s), the partial segment(s) can be used by the reconstruction module 53 in reconstructing the segment. In such a reconstruction operation, the reconstruction module 53 can reconstruct the segment using the most recently received full segment update, which may be stored in the tape log module 52 or in a block queue element 75(b), and merging therein the partial segment(s) which were received after the most recently received full segment update. The reconstruction module 53 can use the pointer(s) in the hash table 71 to the various segment update(s) for the segment in the block queue 70 to identify the ones of the block queue elements 75(b) which contain valid segment update(s) for use in the reconstruction operation. It will be appreciated that, when the filter/buffer module 51 receives a full segment update for a particular segment, it will invalidate all previously-received partial segment updates for the segment as indicated in the hash table 71.

In addition, although the filter/buffer module 51 has been described in one embodiment as maintaining the segment updates that it is buffering in a queue, it will be appreciated that other arrangements may be used to store the segment updates. Similarly, although the tape log module 52 has been described as maintaining the segment updates to be stored on the current logging cartridge 136(l) in an input queue 132, it will be appreciated that other arrangements may be used to store such segment updates. Furthermore, although the remote data protection facility 10 has been described as providing storage for fixed-length segments, it will be appreciated that the facility 10 may instead or also be used to provide storage for variable length structures such as records.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer program product for use in connection with a programmable device to provide a data item reconstruction element for reconstructing information stored on a back-up information storage subsystem, the back-up information storage subsystem including a plurality of storage media each associated with one of a plurality of sets, the sets being configured to store data item updates from diverse protected volumes with data item updates associated with each protected volume being stored on storage media associated with one of said sets, said computer program product comprising a device readable medium having encoded thereon:

a) a valid data item update identifier module configured to enable the programmable device to, during a reconstruction operation in connection with one protected volume. identify valid ones of the data item updates associated with said one protected volume stored on the storage media of the set on which data item updates associated with said one protected volume are stored; and b) a valid data item retrieval control module configured to enable the programmable device to retrieve from said storage media the ones of the data item updates identified by said valid data item update identifier module as being valid, the valid data item retrieval control module being configured to enable the programmable device to retrieve in parallel data item updates from a plurality of said storage media associated with the one of said sets on which data item updates associated with the one protected volume are stored, to obtain valid data item updates which are is associated with said one protected volume.

2. A computer program product as defined in claim 1 in which said valid data item update identifier module is configured to enable the programmable device to process (i) a storage medium directory including a series of directory entries each identifying, for a corresponding one of the series of data item updates recorded on a source storage media, a data item identifier associated with said corresponding one of the series of data item updates, and (ii) a data item identifier flag set comprising a plurality of data item identifier flags, each associated with one of said data item identifiers, each flag having a valid condition indicating that the source storage media has a valid data item update associated with the respective data item identifier flag's associated data item identifier stored thereon, and at least one other condition, in connection with each of said storage media of the set on which data items associated with the one protected volume are stored, thereby to identify valid ones of the data item updates associated with the one protected volume stored on the storage media of the set on which the data item updates associated with the one protected volume are stored.

3. A computer program product as defined in claim 2 in which said valid data item update identifier module is configured to enable the programmable device to, for each storage media of the set on which data item updates associated with the at least one protected volume are stored, scan the directory entries in said directory in reverse order and, for each directory entry, determine whether the data item identifier flag associated with the data item identifier contained in the directory entry indicates that the storage media has a valid data item update associated with the respective flag's associated data item identifier stored thereon and, if so, determine that the data item update associated with the directory entry is a valid data time update.

4. A computer program product as defined in claim 3 in which the valid data item update identifier module is further configured to enable the programmable device to condition one of the data item identifier flags associated with the data item identifier to said at least one other condition when it determines that the data item update associated with the directory entry is a valid data item update.

5. A computer program product as defined in claim 4 in which said valid data item update identifier module includes:

a) a directory entry selector module configured to enable the programmable device to select a directory entry;

b) a validity determination generation element configured to enable the programmable device to use the data item identifier flag associated with the data item identifier by the selected directory enter to generate a validity indication indicating whether the selected directory entry is associated with a valid data item update;

c) a data item identifier flag conditioner module configured to enable the programmable device to, in response to the validity indication (generated by the validity determination generation element indicating that the selected directory entry is associated with a valid data item update, condition the data item identifier flag associated with the data item identifier identified by the selected directory entry to said at least one other condition; and d) an iteration control element configured to enable the programmable device to control the directory entry selector module, said validity determination generation element and said data item identifier flag conditioner module through a series of iterations.

6. A computer program product as defined in claim 5 in which said iteration control element is configured to enable the programmable device to enable said directory entry selector module to, in each of said series of iterations, select the one of the directory entire which precedes the directory entry selected during the preceding iteration.

7. A computer program product as defined in claim 6 in which said iteration control element is configured to enable the programmable device to enable said directory entry selector module to, in a first iteration, select the last directory entry in the storage medium directory.

8. A computer program product as defined in claim 5 in which said iteration control element is configured to enable the programmable device to terminate iterations with the iteration in which the directory entry selector module selects the first directory entry in the storage medium directory.

* * * * *